United States Patent [19]

Skinger

[11] Patent Number: 5,698,833
[45] Date of Patent: Dec. 16, 1997

[54] OMNIDIRECTIONAL BARCODE LOCATOR

[75] Inventor: Gregory Philip Skinger, Southbury, Conn.

[73] Assignee: United Parcel Service of America, Inc., Atlanta, Ga.

[21] Appl. No.: 632,089

[22] Filed: Apr. 15, 1996

[51] Int. Cl.$^6$ ........................................ G06K 7/10
[52] U.S. Cl. .................. 235/462; 235/470; 250/229.08; 382/183
[58] Field of Search ........................... 235/462, 454, 235/471, 472, 470, 463; 250/208.1, 559.08; 382/183

[56] References Cited

U.S. PATENT DOCUMENTS

| | | | |
|---|---|---|---|
| 4,403,339 | 9/1983 | Wevelsiep et al. | 235/463 X |
| 4,411,016 | 10/1983 | Wakeland | 235/440 |
| 4,646,353 | 2/1987 | Tenge et al. . | |
| 5,124,537 | 6/1992 | Chandler et al. | 235/462 |
| 5,134,272 | 7/1992 | Tsuchiya et al. | 235/462 |
| 5,155,343 | 10/1992 | Chandler et al. | 235/462 |
| 5,296,690 | 3/1994 | Chandler et al. | 235/462 |
| 5,304,787 | 4/1994 | Wang | 235/462 |
| 5,319,181 | 6/1994 | Shellhammer et al. | 235/462 |
| 5,367,578 | 11/1994 | Golem et al. | 382/183 |
| 5,373,147 | 12/1994 | Noda | 235/462 |
| 5,396,054 | 3/1995 | Krichever et al. | 235/462 |
| 5,422,470 | 6/1995 | Kubo | 235/462 |
| 5,428,211 | 6/1995 | Zheng et al. | 235/462 |
| 5,438,188 | 8/1995 | Surka | 235/462 |
| 5,446,271 | 8/1995 | Cherry et al. | 235/462 |
| 5,468,946 | 11/1995 | Oliver | 235/462 |
| 5,489,769 | 2/1996 | Kubo | 235/462 |
| 5,510,604 | 4/1996 | England | 235/462 |
| 5,512,739 | 4/1996 | Chandler et al. | 235/462 |
| 5,563,958 | 10/1996 | Higgins et al. | 382/183 |
| 5,591,952 | 1/1997 | Krichever et al. | 235/462 |
| 5,635,697 | 6/1997 | Shellhammer et al. | 235/462 |
| 5,635,699 | 6/1997 | Cherry et al. | 235/462 |

FOREIGN PATENT DOCUMENTS

| | | |
|---|---|---|
| 59-4009 | 1/1984 | Japan . |
| 60-217624 | 10/1985 | Japan . |
| 61-35508 | 2/1986 | Japan . |
| 2-292810 | 12/1990 | Japan . |
| 3-208326 | 9/1991 | Japan . |
| 3-248523 | 11/1991 | Japan . |
| 5-114534 | 5/1993 | Japan . |
| 5-286081 | 11/1993 | Japan . |
| 5-291104 | 11/1993 | Japan . |
| 6-60372 | 3/1994 | Japan . |
| 6-66819 | 3/1994 | Japan . |
| 6-96444 | 4/1994 | Japan . |

*Primary Examiner*—Donald T. Hajec
*Assistant Examiner*—Michael G. Lee
*Attorney, Agent, or Firm*—Jones & Askew, LLP

[57] ABSTRACT

An efficient method and apparatus for determining the location and approximate orientation of a barcode on a substrate. The inventive method is preferably implemented by an omnidirectional barcode locator including an application specific integrated circuit that includes one or more field programmable gate arrays (FPGAs). The digit image is a one-bit (i.e., black/white) representation of a standard eight-bit grey scale video image produced by the CCD camera. The use of a one-bit digital video signal reduces the amount of mass storage memory required to store images of barcodes and facilitates the manipulation of the video signal by the application specific integrated circuit. The omnidirectional barcode locator processes, in real-time, a digital video signal defining a pixelized image of a conveyor carrying parcels through the field of view of a CCD camera. The omnidirectional barcode locator divides the video image into a plurality of cells and produces two output signals, a cell barcode indication signal and a cell barcode orientation signal, for each cell. A host computer responds to a "true" cell barcode indication signal for a cell by storing the portion of the video image corresponding to the cell in a mass storage memory. The host computer also stores a representation of the cell barcode orientation signal for each cell in which the cell barcode indication signal is "true." The omnidirectional barcode locator thus allows the host computer to store only those cells of the video image that contain barcode data. The barcode data may then be provided to a barcode reader for further processing.

23 Claims, 19 Drawing Sheets

FIG. 3A

NUMBER OF COLUMNS = m
NUMBER OF ROWS = n

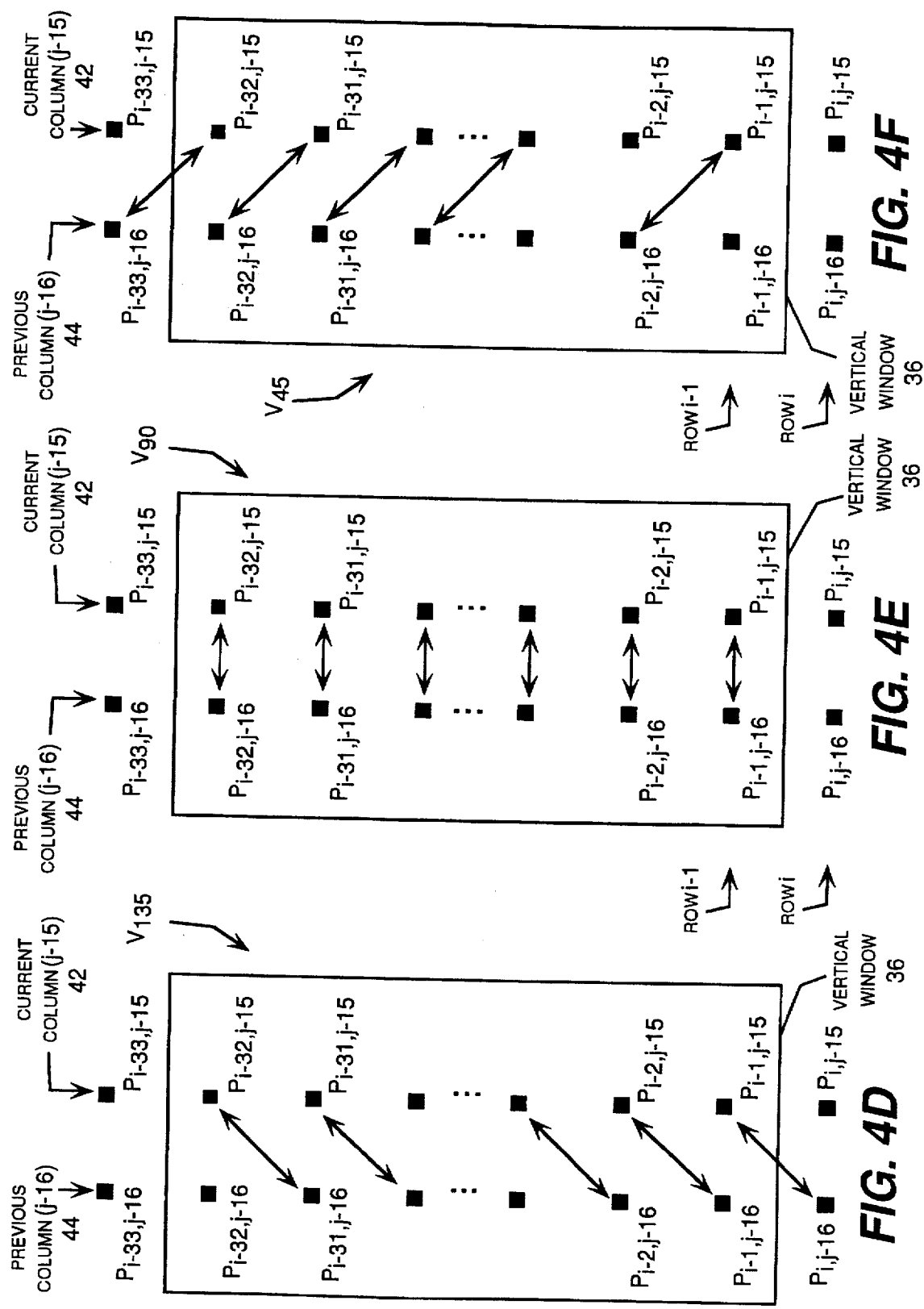

OMNIDIRECTIONAL BARCODE LOCATOR

TECHNICAL FIELD

The present invention relates to image processing and more particularly relates to over-the-belt optical reader systems. Specifically, the present invention relates to a method and apparatus for determining the location and approximate orientation of barcodes on packages moving along a conveyor.

BACKGROUND OF THE INVENTION

For years, machines have been used to scan parcels as they move along a conveyor. Over-the-belt optical reader systems have been recently developed that can capture an image of the surface of a parcel as it moves along a conveyor, and then create and process a representation of the image. The fundamental physical components of an over-the-belt optical reader system are a sensor, an analog-to-digital (A/D) converter, and a computer comprising a central processing unit (CPU) and a memory. The individual physical components of an over-the-belt optical reader system are all well known in the art, and many alternative embodiments of each of the individual physical components are commercially available, with differing cost and performance characteristics. Much effort goes into finding the most efficient combinations of components for particular applications, and in the development of computer software programs that process the images created by these familiar physical components.

Charge-coupled device (CCD) sensor arrays are often used in over-the-belt optical reader systems. A CCD camera consists of an array of electronic "pixels," each of which stores an accumulated charge according to the amount of light that strikes the pixel. A CCD camera is used to capture an image of the surface of a parcel as it moves along a conveyor. The image is converted into digital format which may be stored as a bit map in a computer memory. The CCD array is then cleared as the charge within each pixel is read, and the array is ready to capture the image of another parcel or section of a parcel. In this manner, a single CCD camera is used to scan a great many parcels.

Computers that may be used to process the images captured by CCD cameras vary in computation speed and other parameters. Generally, a faster computer is more expensive than a slower computer, a computer with a large memory capacity is more expensive than a computer with a smaller memory capacity, and a special purpose computer is more expensive than a general purpose computer. There is therefore a financial motivation to use inexpensive computing devices whenever such are suitable for a particular purpose.

Parcel delivery companies, such as United Parcel Service (UPS), make extensive use of over-the-belt optical reader systems. UPS ships millions of parcels every day. Each parcel is typically assigned a unique tracking number that is used to identify the parcel as it is moved through the delivery process. The tracking number is displayed on the surface of a parcel in the form of a machine readable barcode. Over-the-belt optical reader systems are used to read these barcodes at various points in the delivery process to facilitate tracking of the parcels. In order to read a barcode, an image of the barcode must first be captured. Therefore, a video data source such as a CCD camera is typically used to produce a continuous image of a conveyor as is transports parcels.

A continuously running CCD camera generates an enormous amount of computer data. Most of the data is a useless image of the conveyor and the non-barcode bearing areas of the parcels moving along the conveyor; only a small percentage of the data includes the barcodes. Saving all of the data produced by a continuously running CCD camera would require an enormous amount of computer memory. There is a therefore a need for an inexpensive computing device that can, in real-time, accurately identify the location of a barcode on a parcel as the parcel moves along a conveyor. The barcode position information may then be used to limit the amount of CCD camera data that needs to be stored for use by a barcode reader to the relatively small areas in which barcodes are detected.

Chandler et al., U.S. Pat. Nos. 5,296,690 and 5,155,343, describe an omnidirectional barcode reader for determining the position and orientation of a barcode. A two dimensional raster scan image containing the barcode is captured and stored in a general purpose computer memory. Sets of two parallel scan lines are then processed to determine the location and orientation of the barcode. The method described by Chandler et al. for locating a barcode requires computing the point by point product of respective derivatives of the two parallel scan lines. The location and coarse orientation of the barcode is determined by scanning the image in each of four directions: horizontal, rising diagonal, vertical, and falling diagonal. The fine orientation of the barcode is determined by cross-correlating parallel scan lines in pairs. The system described by Chandler et al. uses an application specific integrated circuit (ASIC) to determine the location and coarse orientation of a barcode, and a subsequent digital signal processor program to finely orient, filter, and scan the coarsely located barcode.

The system described by Chandler et al. would have a significant drawback if applied to a system for reading barcodes on packages moving along a conveyor. Namely, all of the data captured by the CCD camera would have to be stored for subsequent processing by the digital signal processor because the system described by Chandler et al. is not operable for determining in real-time the locations and orientations of barcodes on parcels moving along a conveyor. As pointed out above, most of the data captured by a CCD camera that is used to continuously scan a moving conveyor is a useless image of the conveyor and the non-barcode bearing areas of the parcels moving along the conveyor; only a small percentage of the data includes the barcodes.

Therefore, there remains after Chandler et al. a need for an improved high speed, low cost omnidirectional barcode locator. There also remains a need for an improved computationally efficient omnidirectional barcode locator. More specifically, there remains a need for an omnidirectional barcode locator that can be used to determine in real-time the location and approximate orientation of a barcode on a parcel moving along a conveyor so that the amount of CCD camera data that must be stored for subsequent processing by a barcode reader may be reduced.

SUMMARY OF THE INVENTION

The present invention meets the above-described needs by providing an efficient method for determining the location and approximate orientation of a barcode on a substrate. The inventive method is preferably implemented by an omnidirectional barcode locator including an application specific integrated circuit that includes one or more field programmable gate arrays (FPGAs). The omnidirectional barcode locator processes, in real-time, a digital video signal defining a pixelized image of a conveyor carrying parcels through the field of view of a CCD camera. The digit image is a one-bit (i.e., black/white) representation of a standard eight-bit grey scale video image produced by the CCD camera. The use of a one-bit digital video signal reduces the amount of mass storage memory required to store images of barcodes and facilitates the manipulation of the video signal by the application specific integrated circuit. The omnidirectional barcode locator divides the video image into a plurality of cells and produces two output signals, a cell barcode indication signal and a cell barcode orientation signal, for each cell. A host computer responds to a "true" cell barcode indication signal for a cell by storing the portion of the video image corresponding to the cell in a mass storage memory. The host computer also stores a representation of the cell barcode orientation signal for each cell in which the cell barcode indication signal is "true." The omnidirectional barcode locator thus allows the host computer to store only those cells of the video image that contain barcode data. The barcode data may then be provided to a barcode reader for further processing.

Generally described, the present invention provides a method for detecting and storing an image of a barcode on a substrate. A pixel stream defining a pixelized image of the substrate is obtained. The pixel stream is channeled through a buffer memory and pixels are assigned to a plurality of cells. For each cell, a cell barcode indication value is determined, and pixels within a cell are stored in a mass storage computer memory if the cell barcode indication value is greater than a predetermined threshold value. In addition, a cell barcode orientation value is determined for each cell, and a representation of the cell barcode orientation value is stored in a mass storage computer memory if the cell barcode indication value is greater than the predetermined threshold value.

A cell barcode indication value is computed for each pixel within a cell. The presence of a barcode is detected for a current pixel by comparing pixels of a current row within a horizontal window with pixels of a previous row in three directions. For the horizontal comparisons, if a relatively high number of matching pixels are found in one direction and a relatively low number of matches are found in another direction, the current pixel is identified as a barcode candidate pixel. Similarly, the presence of a barcode is also detected for the current pixel by comparing pixels of a current column within a vertical window with pixels of a previous column in three directions. For the vertical comparisons, if a relatively high number of matching pixels are found in one direction and a relatively low number of matches are found in another direction, the current pixel is identified as a barcode candidate pixel. The cell barcode indication value is computed by totalizing the number of barcode candidate pixels within the cell.

The inventive method for detecting the presence of a barcode on a substrate is generally described as follows. A pixelized image of the substrate is obtained. The pixelized image includes sequential parallel left-to-right rows of pixels forming orthogonal bottom-to-top columns of pixels. A first horizontal comparison value is computed by comparing the intensity of pixels of a current row to the intensity of pixels of a previous row wherein, for each comparison, the column of the pixel of the current row is to the left of the column of the pixel of the previous row. A second horizontal comparison value is computed by comparing the intensity of pixels of the current row to the intensity of pixels of the previous row wherein, for each comparison, the column of the pixel of the current row is the same as the column of the pixel of the previous row. A third horizontal comparison value is computed by comparing the intensity of pixels of the current row to the intensity of pixels of the previous row wherein, for each comparison, the column of the pixel of the current row is to the right of the column of the pixel of the previous row. A horizontal barcode detection value is computed based on one or more of the first, second, and third comparison values. The horizontal barcode detection value is then compared to a horizontal barcode detection threshold value. A horizontal barcode orientation value may also be computed based on one or more of the first, second, and third horizontal comparison values.

The inventive method for detecting the presence of a barcode on a substrate is more specifically described as follows. A pixelized image of the substrate is obtained. The pixelized image includes sequential parallel left-to-right rows of pixels forming orthogonal bottom-to-top columns of pixels. A cell is defined that includes a plurality of pixels. For each of a plurality of pixels within the cell, a horizontal window is defined that includes a plurality of adjacent pixels along a current row of pixels. A first horizontal comparison value is computed by comparing the intensity of pixels of the current row to the intensity of pixels of a previous row wherein, for each comparison, the column of the pixel of the current row is to the left of the column of the pixel of the previous row. A second horizontal comparison value by comparing the intensity of pixels of the current row to the intensity of pixels of the previous row wherein, for each comparison, the column of the pixel of the current row is the same as the column of the pixel of the previous row. A third horizontal comparison value is computed by comparing the intensity of pixels of the current row to the intensity of pixels of the previous row wherein, for each comparison, the column of the pixel of the current row is to the right of the column of the pixel of the previous row. A horizontal barcode detection value is then computed for the current pixel based on one or more of the first, second, and third horizontal comparison values.

A vertical window is also defined that includes a plurality of adjacent pixels along a current column of pixels. A first vertical comparison value is computed by comparing the intensity of pixels of the current column to the intensity of pixels of a previous column wherein, for each comparison, the row of the pixel of the current row is to the top of the row of the pixel of the previous column. A second vertical comparison value is computed by comparing the intensity of pixels of the current column to the intensity of pixels of the previous column wherein, for each comparison, the row of the pixel of the current column is the same as the row of the pixel of the previous column. A third vertical comparison value is computed by comparing the intensity of pixels of the current column to the intensity of pixels of the previous column wherein, for each comparison, the row of the pixel of the current column is to the bottom of the row of the pixel of the previous column. A vertical barcode detection value is then computed for the current pixel based on one or more of the first, second, and third vertical comparison values.

For each pixel, the horizontal barcode detection value is compared to a horizontal barcode detection threshold value, and the vertical barcode detection value is compared to a vertical barcode detection threshold value. A cell barcode indication value is computed based on the horizontal and vertical barcode detection values for the pixels within the cell, and the cell barcode indication value is compared to a cell threshold value. In addition, a horizontal barcode orientation value may be computed for each pixel based on one or more of the first, second, and third horizontal comparison values. Similarly, a vertical barcode orientation value may be computed for each pixel based on one or more of the first, second, and third vertical comparison values. A cell barcode orientation value may then be computed based on the horizontal and vertical barcode orientation values for the pixels within the cell.

According to another aspect of the present invention, the previous row may immediately precede the current row and the previous column may immediately precede the current column. In addition, the step of computing a first horizontal comparison value may include comparing the intensity of pixels of the current row to the intensity of pixels of the previous row wherein, for each comparison, the column of the pixel of the current row is one column to the left of the column of the pixel of the previous row. The step of computing a third horizontal comparison value may include comparing the intensity of pixels of the current row to the intensity of pixels of the previous row wherein, for each comparison, the column of the pixel of the current row is one column to the right of the column of the pixel of the previous row. The step of computing a first vertical comparison value may include comparing the intensity of pixels of the current column to the intensity of pixels of the previous column wherein, for each comparison, the row of the pixel of the current column is one row to the top of the row of the pixel of the previous column. The step of computing a third vertical comparison value may include comparing the intensity of pixels of the current column to the intensity of pixels of the previous column wherein, for each comparison, the row of the pixels of the current column is one row to the bottom of the row of the pixel of the previous column.

According to another aspect of the present invention, if the cell barcode indication value is greater than the cell threshold value, the portion of the pixelized image that is within the cell is stored in a mass storage computer memory. In addition, if the cell barcode indication value is greater than the cell threshold value, a representation of the cell barcode orientation value is stored in the mass storage computer memory.

According to another aspect of the present invention, the steps performed for each row of pixels within the cell are performed concurrently with the steps performed for each column of pixels within the cell. In addition, the horizontal barcode orientation value is computed concurrently with horizontal barcode detection value; and vertical barcode orientation value is computed concurrently with the vertical barcode detection value.

The present invention also provides an apparatus operable for detecting the presence and approximate orientation of a barcode on a substrate. The apparatus includes a buffer memory operable for receiving a digital video signal including a pixelized image of the substrate wherein the pixelized image includes sequential parallel left-to-right rows of pixels forming orthogonal bottom-to-top columns of pixels. The apparatus also includes a horizontal detector operable for receiving a stream of pixels from the buffer memory, and for a plurality of the pixels, defining a horizontal window including a plurality of adjacent pixels along a current row of pixels and computing a horizontal barcode detection value based on a comparison of the pixels of the current row to the pixels of a previous row. The apparatus also includes a vertical detector operable for receiving a stream of pixels from the buffer memory, and for a plurality of the pixels, defining a vertical window comprising a plurality of adjacent pixels along a current column of pixels and computing a vertical barcode detection value based on a comparison the pixels of the current column to the pixels of a previous column. The apparatus also includes a trigger detector operable for receiving the horizontal barcode detection values from the horizontal detector and for receiving the vertical barcode detection values from the vertical detector, and determining a candidate value for a plurality of the pixels based on a horizontal barcode detection value and a vertical barcode detection value. The apparatus also includes a totalizer operable for receiving the candidate values from the trigger detector, defining a cell comprising a plurality of the pixels, and determining a cell barcode indication value based on the candidate values corresponding to the pixels within the cell.

According to another aspect of the present invention, the horizontal detector is further operable, for a plurality of the pixels, for computing a horizontal barcode orientation value based on a comparison of the pixels of the current row to the pixels of a previous row. The vertical detector is further operable, for a plurality of the pixels, for computing a vertical barcode orientation value based on a comparison of the pixels of the current column to the pixels of a previous column. The trigger detector is further operable, for a plurality of the pixels, for determining a candidate orientation value based on the horizontal and vertical barcode orientation values. The totalizer is further operable for determining a cell barcode orientation value based on the candidate orientation values corresponding to the pixels within the cell.

According to another aspect of the present invention, one or more of the horizontal detector, the vertical detector, the trigger detector, and the totalizer include a field programmable gate array.

Therefore, it is an object of the present invention to provide an improved high speed, low cost omnidirectional barcode locator.

It is a further object of the present invention to provide an improved computationally efficient omnidirectional barcode locator.

More specifically, it is an object of the present invention to provide an omnidirectional barcode locator that can be used to determine in real-time the location and approximate orientation of a barcode on a parcel moving along a conveyor so that the amount of camera data that must be stored for subsequent processing by a barcode reader may be reduced.

That the present invention improves over the drawbacks of the prior art and accomplishes the objects of the invention will become apparent from the following detailed description of the preferred embodiment and the appended drawings and claims.

BRIEF DESCRIPTION OF THE DRAWINGS

FIG. 2, including

FIG. 3, including FIGS. 3A and 3B, illustrates a convention for defining pixel positions within a digital image.

FIG. 4, including FIGS. 4A–4F, illustrates the computation of comparison values in an omnidirectional barcode locator.

FIG. 5, including

DETAILED DESCRIPTION

The detailed description which follows is presented largely in terms of processes and symbolic representations of operations of data bits manipulated by a processing unit and maintained within data structures supplied by one or more memory storage devices. Such data structures impose a physical organization upon the collection of data bits stored within computer memory and represent specific electrical or magnetic elements. These algorithmic descriptions and symbolic representations are the means used by those skilled in the art of computer programming and computer construction to most effectively convey teachings and discoveries to others skilled in the art.

For the purposes of this discussion, a method or process is generally conceived to be a sequence of computer-executed steps leading to a desired result. These machine-implemented steps, which can be maintained as in the form of an executable program module (i.e., software) or an application specific integrated circuit (i.e., hardware), generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, numbers, records, files, or the like. It should be kept in mind, however, that these and similar terms should be associated with appropriate physical quantities for computer operations, and that these terms are merely conventional labels applied to these physical quantities that exist within the computer.

In addition, it should be understood that the programs, processes, methods, etc., described herein are not related or limited to any particular computer, processor, or apparatus. Rather, various types of computing devices may be used to perform the method steps described herein. In particular, the preferred embodiments described herein rely upon an application specific integrated circuit (ASIC) including one or more field programmable gate arrays (FPGAs) to perform the computer-implemented processes described herein. However, it will be appreciated that other types of computing devices such as traditional von Neumann processors or other types of dedicated hardware systems could equivalently be used to perform the method steps described herein.

Figure 1:
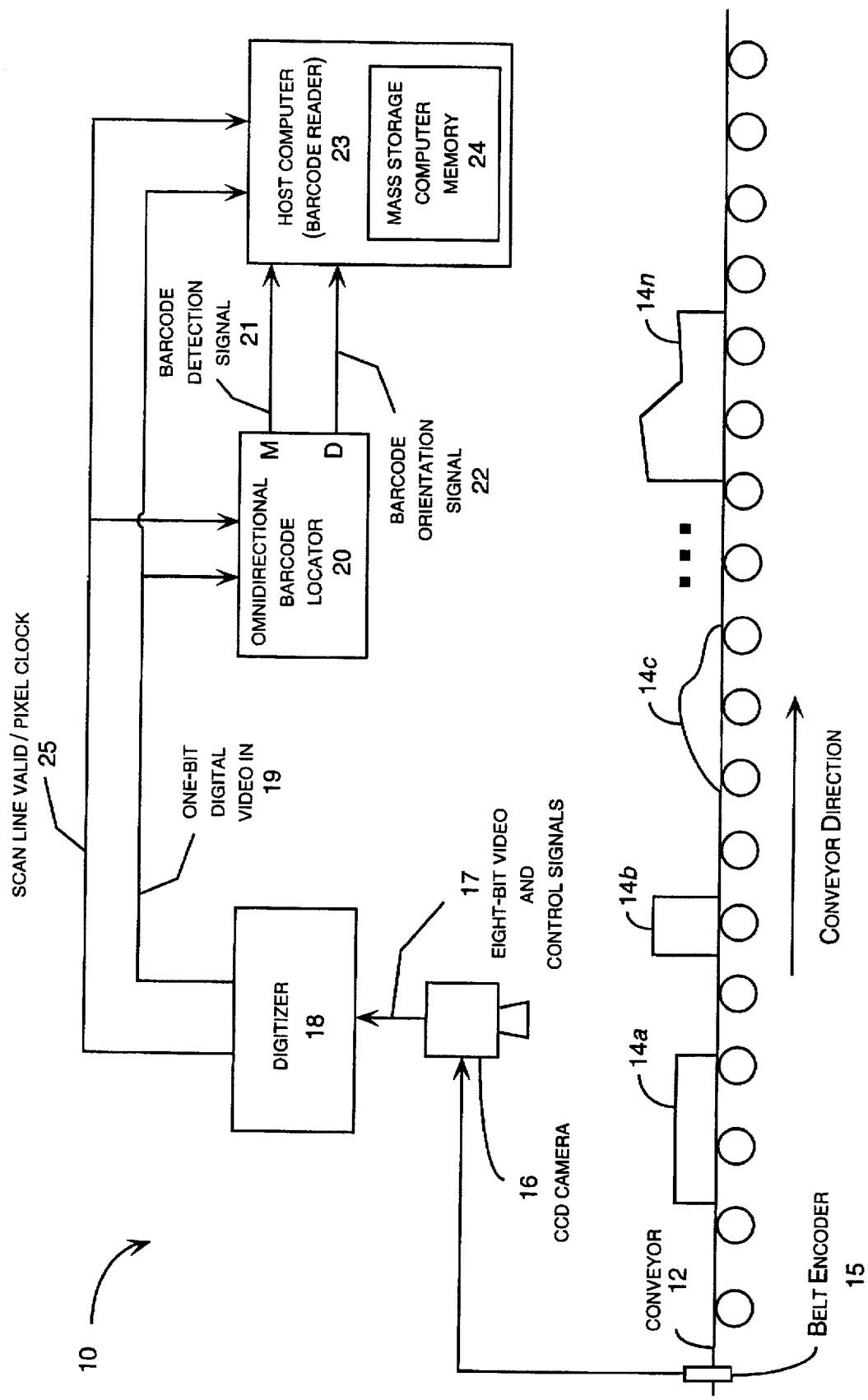
FIG. 1 is a diagram of an over-the-belt optical barcode reader system that provides the operating environment for the preferred embodiments of the present invention.

Description of the Operating Environment of the Preferred Embodiments of the Present Invention Referring now to the drawings, in which like numerals indicate like elements throughout the several figures, FIG. 1 is a diagram of an over-the-belt optical barcode reader system 10 that provides the operating environment for the preferred embodiments of the present invention. The barcode reader system 10 includes a conveyer 12 on which parcels 14a through 14n are carried. A belt encoder 15 produces a signal indicating the horizontal displacement of the conveyor 12. The CCD camera 16 receives the signal produced by the belt encoder 15 and produces a standard eight-bit grey scale video image of the conveyor 12 and the surface of parcels 14a through 14n from reflected light as the parcels pass beneath the CCD camera 16. The CCD camera 16 transmits the video image and associated control signals 17 to a digitizer 18. The digitizer 18 converts the analog video image produced by the CCD camera into an eight-bit grey scale video signal 26 that is transmitted to a host computer 23 that includes a mass storage memory 24, and a one-bit (i.e., black/white) digital video signal 19 that is transmitted to an omnidirectional barcode locator 20. The omnidirectional barcode locator 20 generates a barcode detection signal 21 and a barcode orientation signal 22 that are transmitted to the host computer 23. The digitizer 18 also transmits control signals 25 including a scan line valid signal and a pixel clock signal to the omnidirectional barcode locator 20 and to the host computer 23. A detailed description of these components, along with a detailed explanation of the operation of the omnidirectional barcode locator 20, appear below.

In summary, the omnidirectional barcode locator 20 processes the one-bit video signal 19 in real-time to determine the barcode detection signal 21 and the barcode orientation signal 22 as parcels 14a through 14n pass beneath the CCD camera 16. The host computer 23 responds to the barcode detection signal 21 by storing the portion of the eight-bit grey scale video signal 26 that includes barcode data in the mass storage memory 24. The host computer 23 also stores a representation of the barcode orientation signal 22 in the mass storage memory 24. The barcodes may subsequently be read and interpreted, typically on a non-real-time basis, by the host computer 23 or some other device. The omnidirectional barcode locator 20 thereby allows the barcode data to extracted from the eight-bit grey scale video signal 26 and stored in the mass computer memory 24 for subsequent processing. The omnidirectional barcode locator 20 also allows a value indicating the approximate orientation of the barcodes on the parcels 14a through 14n to be determined and stored in the mass computer memory 24 for subsequent processing.

The conveyor 12 preferably is approximately 42 inches (107 cm) wide and travels at linear speeds up to 100 inches per second or 500 feet per minute (254 cm per second or 152 meters per minute) or more. The CCD camera 16 is mounted to have an optical path of approximately 154 inches (391 cm) to the conveyor 12, with a 42 inch (107 cm) field of view at the conveyor 12. These parameters may be varied somewhat without unduly affecting the performance of the preferred embodiments of the present invention. To save space, the CCD camera 16 is positioned 60 inches (152 cm) above the center of conveyer 12 and is pointed towards a complex of mirrors (not shown) that increases the optical path from the CCD camera 22 to the conveyor 12 to approximately 154 inches (391 cm). See, for example, Smith et al., U.S. Pat. No. 5,308,960, which is hereby incorporated by reference. See also the commonly owned pending U.S. patent application Ser. No. 08/292,400 entitled "Optical Path Equalizer" filed Aug. 18, 1994, inventors Johannes A. S. Bjorner and Steven L. Smith, incorporated herein by reference.

The CCD camera 16 is preferably a monochrome, 4,096 pixel line-scan type camera such as one using a Thompson TH7833A CCD chip. As the field of view of the CCD camera 16 is approximately 42 inches (107 cm) at the conveyer 12, the resolution of the image created by the CCD camera 16 is approximately 100 pixels or "dots" per inch (DPI) (39 dots per cm) across the conveyor 12. The belt encoder 15 provides a signal indicating the linear displacement of the conveyor 12. The CCD camera 16 is cycled in response to the signal from the belt encoder 15 to generate a series of analog line images that are transmitted to the digitizer 18. The belt encoder 15 preferably triggers the CCD camera 16 at a rate of approximately one hundred cycles per inch (2.5 cm) so that the resolution of the image created by the CCD camera 16 is approximately 100 pixels or "dots" per inch (DPI) (39 dots per cm) in the direction in which the conveyor 12 travels. When the omnidirectional barcode locator 20 indicates the presence of a barcode, the eight-bit digital video signal 26 is stored in the mass storage memory 24 of the host computer 23, typically in the form of a bit map or a bit map equivalent such as a run-length encoded image. It will be appreciated that a digital image such as a bit map with a correct aspect ratio (i.e., the ratio of the length of the image to the width) may be created and stored in the mass storage memory 24 of computer 23 by synchronizing the cycling speed of the CCD camera 16 with the speed of the conveyor 12. See, for example, Shah et al., U.S. Pat. No. 5,291,564, which is incorporated by reference.

The digitizer 18 uses a standard thresholding or similar process to convert the analog signal produced by the CCD camera 16 into the eight-bit digital video signal 26 and the one-bit (i.e., black/white) digital video signal 19. The use of a one-bit digital video signal 19 facilitates the manipulation of the video signal 19 by the application specific integrated circuit of the omnidirectional barcode locator 20, as described in detail below. The host computer 23 is preferably an image processing computer comprising an "INTEL" i860 microprocessor. The operation of the digitizer 18, the host computer 23, and the mass storage memory 24 are well known to those skilled in the art and will not be further described herein.

Figure 2A:
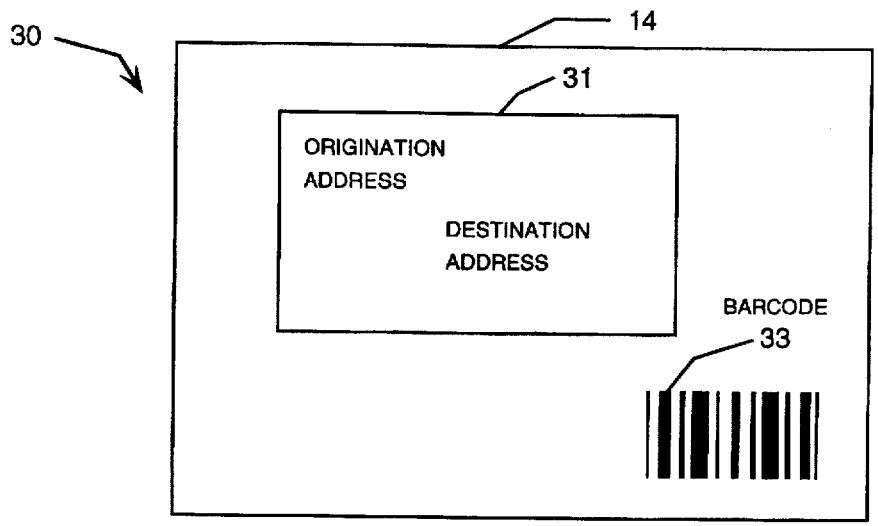
FIGS. 2A and 2B, illustrates the production of a digital video signal by a CCD camera in an over-the-belt optical barcode reader system.
Figure 2B:
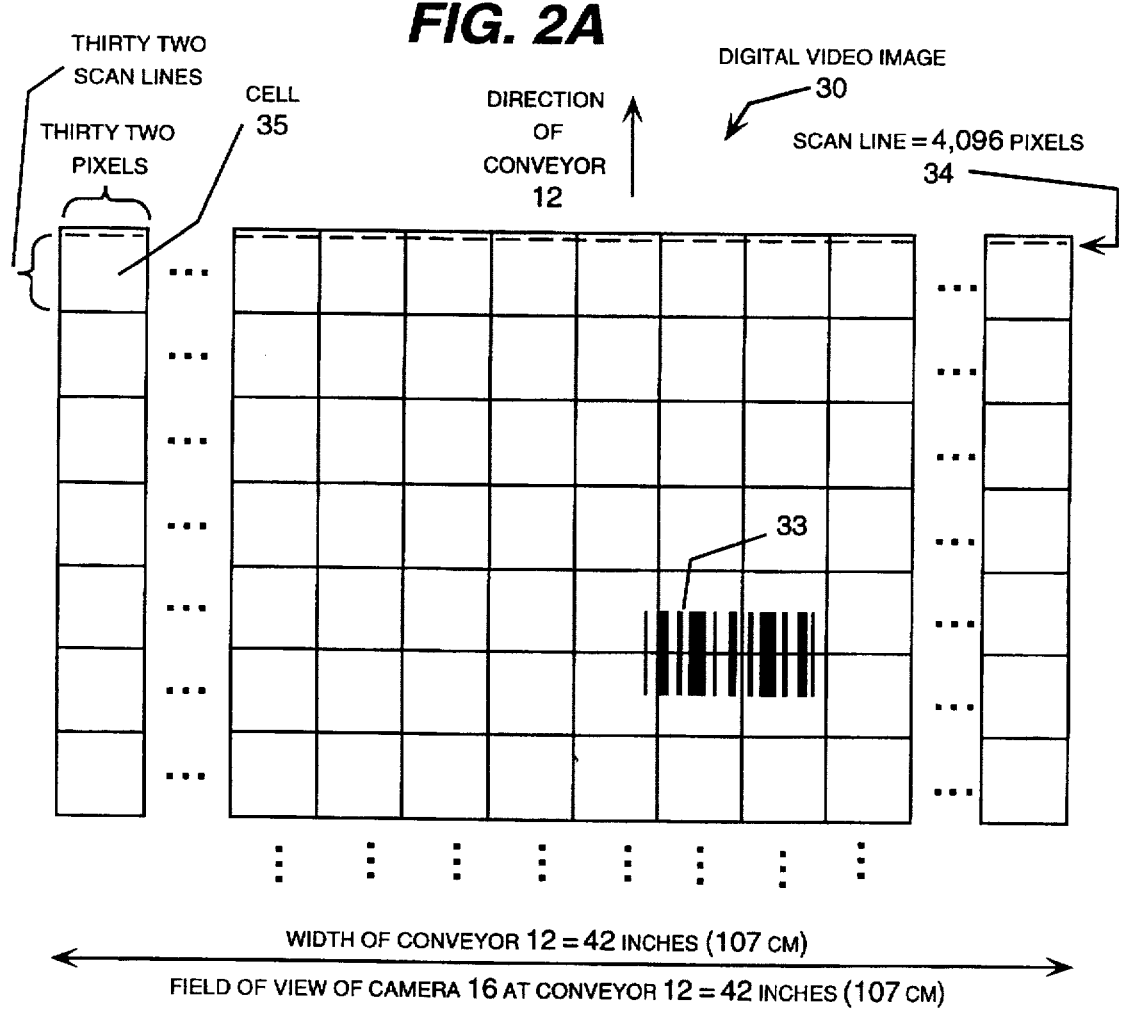

FIG. 2, including FIGS. 2A and 2B, illustrates the production of the digital video image 30 by the CCD camera 16 in the over-the-belt optical barcode reader system 10. As shown in FIG. 2A, parcel 14 includes an address label 31 including the destination address and origination address of the parcel. The parcel 14 also bears a barcode 33 that is approximately one inch (2.5 cm) high and two an one-half to three inches (1.3 to 7.6 cm) wide. The barcode 33 usually includes a code corresponding to the shipping party and a unique tracking code assigned to the package by the parcel shipping company. Sheets or rolls of adhesive-back barcodes labels are typically provided by a parcel shipping company such as UPS. Alternatively, a shipping party may generate barcodes in accordance with instructions from the parcel shipping company when address labels are printed. A parcel shipping company such as UPS typically maintains a database of parcel information including the tracking code, the shipping party, and the destination address of each parcel being shipped. The barcode including the tracking code is typically read by an over-the-belt, hand-held, or other equivalent barcode reader system at various points in the parcel shipping process (e.g., when the parcel is initially received and logged-in to the parcel tracking system, when it is received at a sorting hub, when it is loaded on a plane, when it is received at a distribution hub, when it is loaded on a delivery truck, etc.). The parcel tracking system is updated at each stage of the parcel shipping process so that the tracking code may be used to assess the parcel tracking system to determine the location of a parcel at any point in the parcel shipping process.

Description of the Preferred Method

FIG. 2B illustrates the generation of a digital image of the barcode 33 as the parcel 14 passes beneath the CCD camera 16. A scan line 34 including 4,096 pixels captures an image of the full 42 inch (107 cm) width of the portion of the conveyor 12 that is directly below the CCD camera 16. The CCD camera 16 is cycled in response to the signal from the belt encoder 15 so as to produce approximately 100 scan lines for every linear inch (2.5 cm) that the conveyor 12 travels. The two-dimensional pixelized image 30 thus produced is divided into a plurality of cells represented by cell 35. In the preferred embodiments of the present invention, each cell is preferably includes 32 pixels of 32 consecutive scan lines (i.e. 32 columns and 32 rows of pixels). Each cell is a square with each side approximately one-third of an inch (0.85 cm). It will therefore be appreciated that 32 scan lines comprise 128 cells that are lined-up side-by-side across the conveyor 12. The cells provide a fixed frame of reference within which the omnidirectional barcode locator 20 identifies barcodes. More specifically, the fixed cells, represented by cell 35, provide a standardized unit of the image 30 in which a barcode represented by the barcode 33, or a portion of a barcode, may be detected by the omnidirectional barcode locator 20.

The preferred method implemented by the omnidirectional barcode locator 20 includes computing a horizontal barcode detection value $R_H$, a vertical barcode detection value $R_V$, a horizontal barcode orientation value $S_H$, and a vertical barcode orientation value $S_V$, for each pixel of the image 30. To facilitate the description of the preferred method for computing the values, $R_H$, $R_V$, $S_H$, and $S_V$, it will be necessary to define a convention for referring to individual pixels of the image 30. It will be appreciated that the convention per se is provided for convenience only, and is not intended to limit the scope of the present invention. Any other convention that provides a means for referring to individual pixels in a pixelized or raster image may equivalently be used to describe the method steps performed by the omnidirectional barcode locator 20.

Figure 3A:
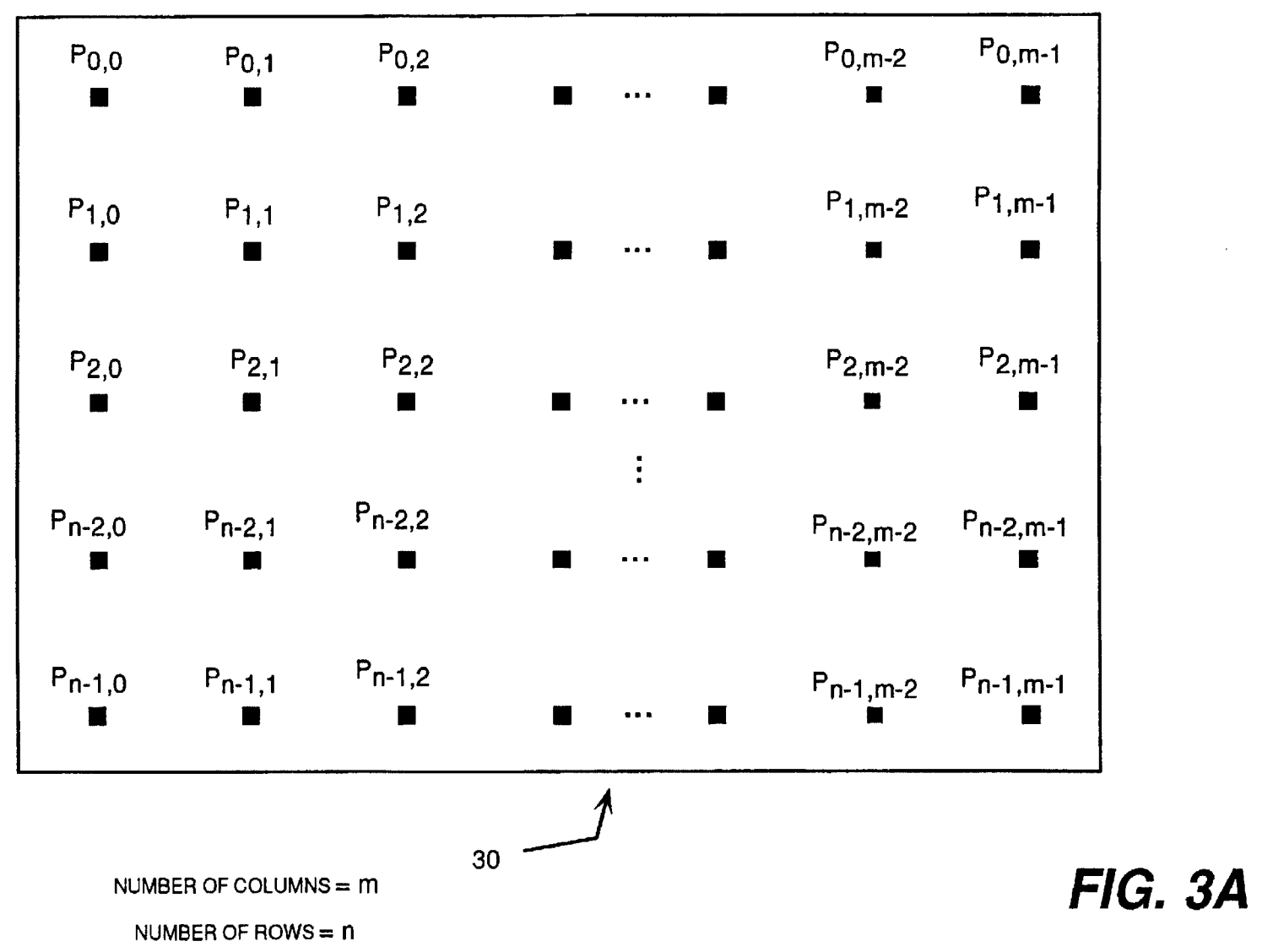
Figure 3B:
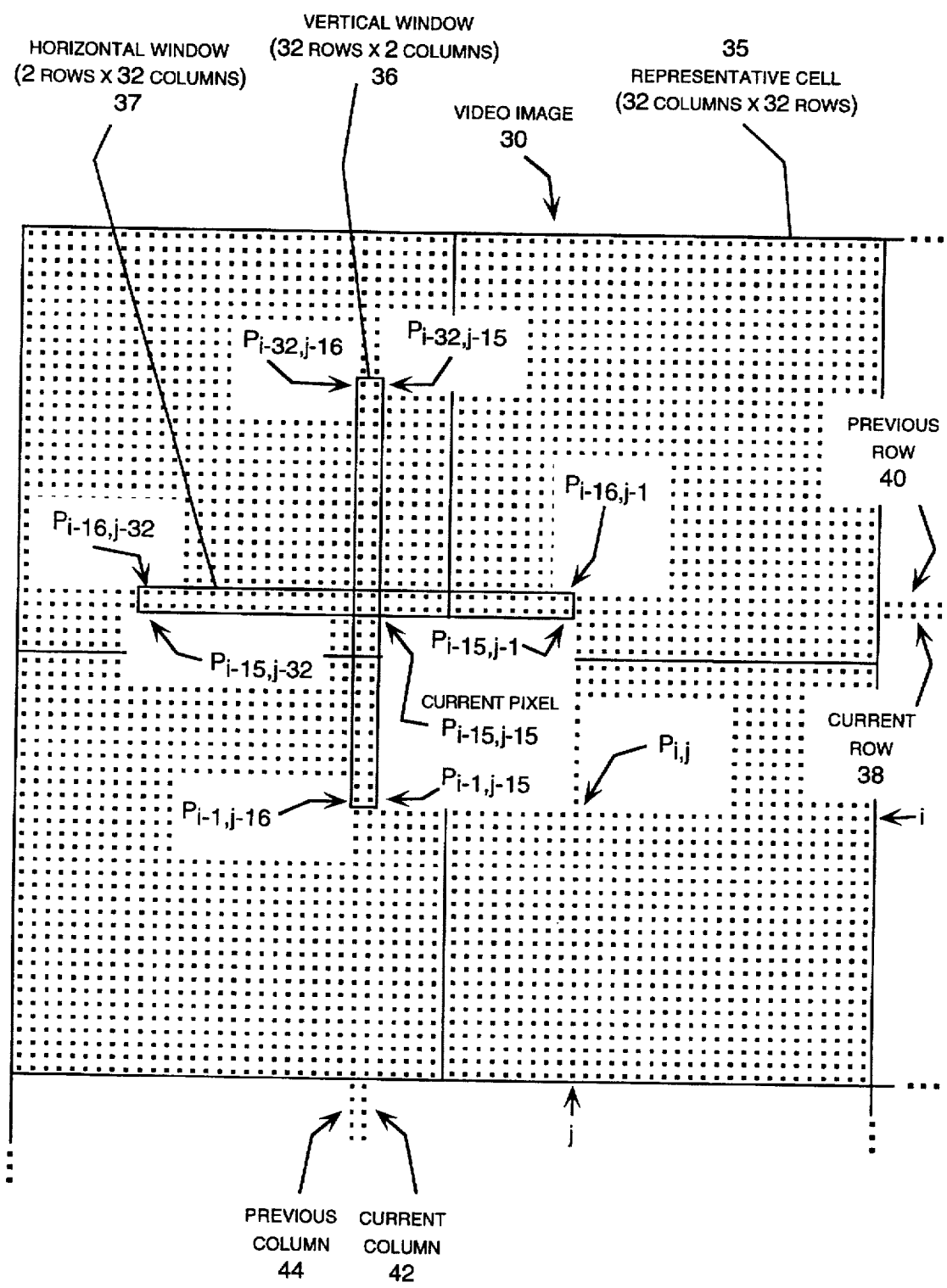

FIG. 3, including FIGS. 3A and 3B, illustrates a convention for defining pixel positions within the digital image 30. Each pixel is denominated as $P_{i,j}$ where "i" is a row number and "j" is a column number. An individual row corresponds to the output of all of the pixels of the CCD camera 16 for a single cycle, such as the representative scan line 34. An individual column corresponds to the output of a particular pixel of the CCD camera 16 over a series of cycles. The digital image 30 includes "m" columns and "n" rows of pixels. The rows are numbered consecutively from top-tobottom starting with row zero whereby row zero is produced by the first cycle of the CCD camera 16, row one by the next cycle, etc. The columns are numbered consecutively from left-to-right starting with column zero whereby column zero is produced by the first pixel of the CCD camera during a plurality of cycles of the CCD camera 16, column one is produced by the second pixel of the CCD camera during a plurality of cycles of the CCD camera 16, etc. In the preferred embodiments, "m" is 4,096 (the number of pixels of the CCD camera 16) and "n" rolls-over every 32 scan lines (the height of a cell).

For the purposes of the following discussion, a particular pixel of the image 30 is referred to as the "current pixel" to indicate that the omnidirectional barcode locator 20 is computing the horizontal and vertical barcode detection value, $R_H$ and $R_V$, and the horizontal and vertical barcode orientation value, $S_H$ and $S_V$, for that particular pixel. Each pixel of the image 30 (excluding the last 15 pixels of each scan line) becomes the "current pixel" at some point in time as the digital video signal 19 is passed through the omnidirectional barcode locator 20. In the preferred embodiments of the present invention, the values $R_H$, $R_V$, $S_H$, and $S_V$ are computed simultaneously. However, the present invention does not require any particular temporal relationship among the computations required to determine the values $R_H$, $R_V$, $S_H$, and $S_V$. For example, these values could be computed sequentially by a conventional von Neumann processor.

FIG. 3B illustrates a portion of the digital image 30 in greater detail. FIG. 3B shows four 32 pixel by 32 pixel cells represented by cell 35. The omnidirectional barcode locator 20 defines a vertical window 36 and a horizontal window 37. It will be useful in the following description of the operation of the omnidirectional barcode locator 20 to conceptualize the windows 36 and 37 as a pair of "sliding" windows that may be simultaneously moved so as to cover different areas of the digital image 30. The horizontal window 37 covers 32 pixels of a current row 38 and 32 pixels of a previous row 40. The vertical window 36 covers 32 pixels of a current column 42 and 32 pixels of a previous column 44. The vertical window 36 and the horizontal window 37 intersect at their respective centers in a "+" configuration. The vertical window 36 and the horizontal window 37 thus define the range of pixels that are used by the omnidirectional barcode locator 20 to determine whether a current pixel is a candidate barcode pixel. The current pixel is the pixel of the current row and the current column that is within the vertical window 36 and the horizontal window 37. In other words, when the pixel $P_{i,j}$ is the most recent pixel read into the omnidirectional barcode reader 20, the current pixel is the pixel in the lower right-hand corner of the square representing the intersection of the windows 36 and 37, pixel $P_{i-15,j-15}$.

The conceptualized movement of the windows 36 and 37 represents the effect of passing the digital video signal 19 through the omnidirectional barcode locator 20. The omnidirectional barcode locator 20 stores 34 scan lines of data for processing at one time. Each time a new scan line is read into the omnidirectional barcode locator 20, the windows 36 and 37 effectively "slide" down one row and thereby delete the scan line that was read into the omnidirectional barcode locator 20 34 cycles previously. In addition, as the new scan line is read into the omnidirectional barcode locator 20, the windows 36 and 37 effectively "slide" from left-to-right across the image 30 with the new scan line positioned one row below the vertical window 36. The current row, as described above, is the row at the center of the vertical window 36. As a new scan line is read into the omnidirectional barcode locator 20, the pixels of the current row 38 (i.e., the row that was read into the omnidirectional barcode locator 20 16 cycles previously) each sequentially become the current pixel. In the following description and the associated figures, the pixels of the image 30 are generally described and shown to correspond to the operation of the omnidirectional barcode locator 20 as if the pixel $P_{i,j}$ is the most recent pixel read into the omnidirectional barcode locator 20, and the current pixel is $P_{i-15,j-15}$. As described below, special procedures apply when the current pixel is within 32 pixels of the left edge of the image 30, i.e., for the first 32 pixels of the CCD camera 16.

Figure 4A:
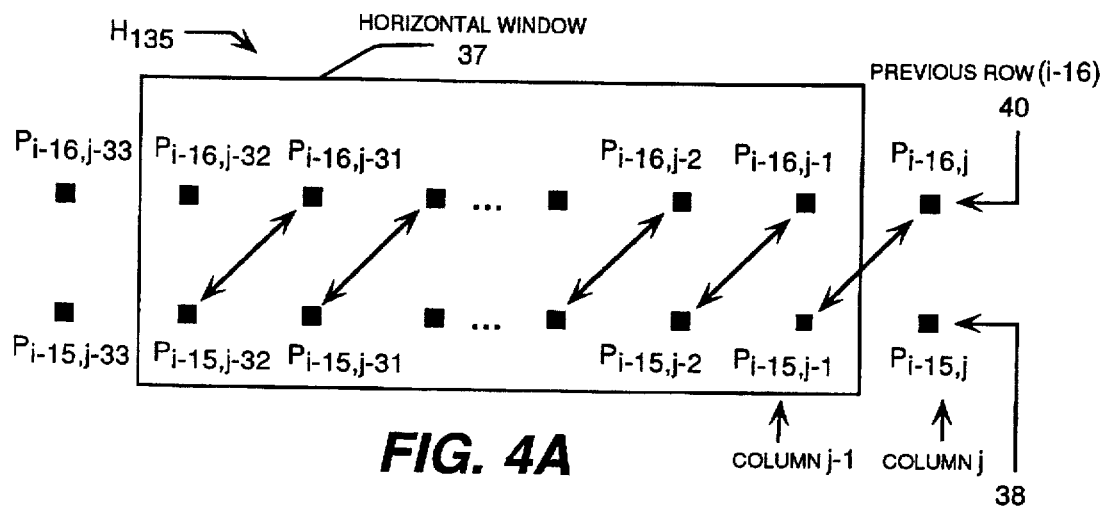
Figure 4B:
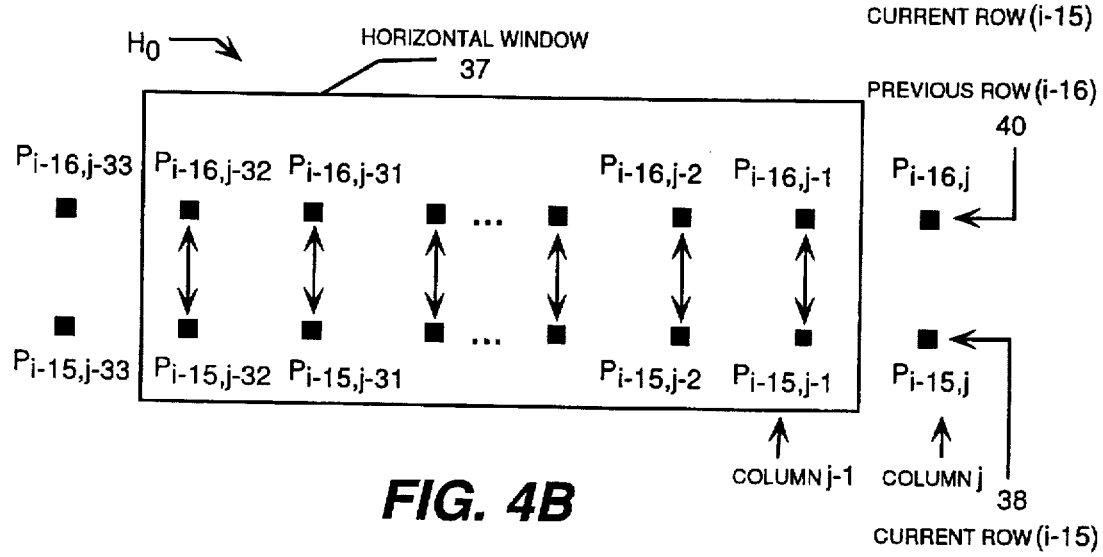
Figure 4C:
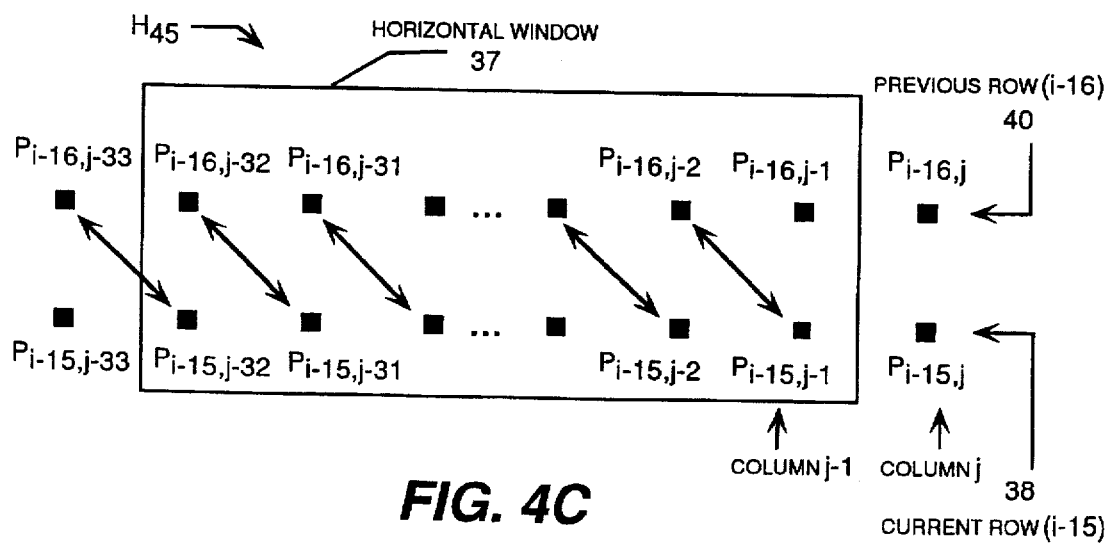

Referring to FIGS. 4 and 5, FIG. 4, including FIGS. 4A–4F, illustrates the computation of comparison values in the omnidirectional barcode locator 20. FIG. 5, including FIGS. 5A–5D, shows a barcode 33 at orientations of 135°, 0°, 45°, and 90°. More specifically, a barcode with an orientation of 135° is illustrated by the barcode 33 in FIG. 5A in which the parallel bars of the barcode predominantly rise from left to right. A barcode with an orientation of 0° is illustrated by the barcode 33' in FIG. 5B in which the parallel bars of the barcode are predominantly vertical. A barcode with an orientation of 45° is illustrated by the barcode 33" in FIG. 5C in which the parallel bars of the barcode predominantly fall from left to right. A barcode with an orientation of 90° is illustrated by the barcode 33'" in FIG. 5C in which the parallel bars of the barcode are predominantly horizontal.

The horizontal barcode detection value $R_H$ is determined by computing three horizontal comparison values, $H_{135}$, $H_0$, and $H_{45}$. Each horizontal comparison value is computed by comparing the value of each pixel of the current row 38 that is within the horizontal window 37 to a pixel of the previous row 40. The comparison value is equal to the number of pixel intensity matches (i.e., black-to-black or white-to-white) occurring for the comparison. More specifically, FIGS. 4A–4C illustrate the computation of the three horizontal comparison values $H_{135}$, $H_0$, and $H_{45}$ for the current pixel $P_{i-15,j-15}$. As shown in FIGS. 4A–4C, the horizontal window 37 covers pixels $P_{i-15,j-1}$ through $P_{i-15,j-32}$ of the current row 38 and pixels $P_{i-16,j-1}$ through $P_{i-16,j-32}$ of the previous row 40.

Figure 5A:
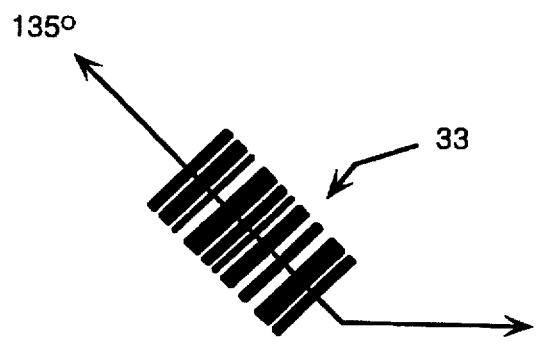
FIGS. 5A–5D, shows barcodes at orientations of 135°, 0°, 45°, and 90°.

The first horizontal comparison value $H_{135}$ is computed by comparing the intensity of pixels of the current row 38 within the horizontal window 37 to the intensity of pixels of the previous row 40 wherein, for each comparison, the column of the pixel of the current row 38 is to the left of the column of the pixel of the previous row 40, as shown in FIG. 4A. For example, pixel $P_{i-15,j-1}$ is compared with pixel $P_{i-16,j}$. $H_{135}$ for the current pixel $P_{i-15,j-15}$ is equal to the number of pixel intensity matches occurring in the comparison illustrated in FIG. 4A. A relatively high number of pixel intensity matches occurring in the direction shown in FIG. 4A indicates the presence of a barcode with a 135° orientation, as shown in FIG. 5A.

Figure 5B:
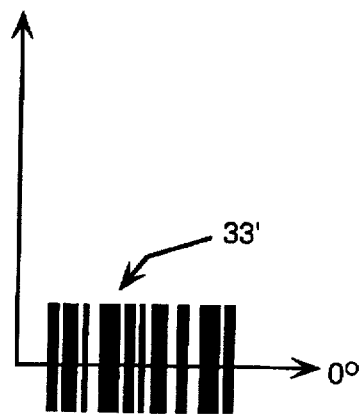

The second horizontal comparison value $H_0$ is computed by comparing the intensity of pixels of the current row 38 within the horizontal window 37 to the intensity of pixels of the previous row 40 wherein, for each comparison, the column of the pixel of the current row 38 is the same as the column of the pixel of the previous row 40, as shown in FIG. 4B. For example, pixel $P_{i-15,j-1}$ is compared with pixel $P_{i-16,j-1}$. $H_0$ for the current pixel $P_{i-15,j-15}$ is equal to the number of pixel intensity matches occurring in the comparison illustrated in FIG. 4B. A relatively high number of pixel intensity matches occurring in the direction shown in FIG. 4B indicates the presence of a barcode with a 0° orientation, as shown in FIG. 5B.

Figure 5C:
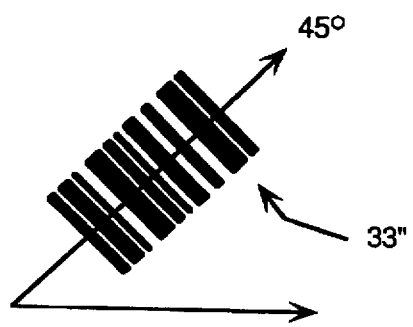

The third horizontal comparison value $H_{45}$ is computed by comparing the intensity of pixels of the current row 38 within the horizontal window 37 to the intensity of pixels of the previous row 40 wherein, for each comparison, the column of the pixel of the current row 38 is to the right of the column of the pixel of the previous row 40, as shown in FIG. 4C. For example, pixel $P_{i-15,j-1}$ is compared with pixel $P_{i-16,j-2}$. $H_{45}$ for the current pixel $P_{i-15,j-15}$ is equal to the number of pixel intensity matches occurring in the comparison illustrated in FIG. 4C. A relatively high number of pixel intensity matches occurring in the direction shown in FIG. 4C indicates the presence of a barcode with a 45° orientation, as shown in FIG. 5C.

The horizontal barcode detection value $R_H$ is equal to the maximum of the three horizontal comparison values, $H_{135}$, $H_0$, and $H_{45}$, minus the minimum of the three horizontal comparison values, $H_{135}$, $H_0$, and $H_{45}$. The horizontal barcode orientation value $S_H$ is equal to the orientation corresponding to the maximum of the three horizontal comparison values, $H_{135}$, $H_0$, and $H_{45}$. Assigning a black pixel the value zero and a white pixel the value one allows the following mathematical expressions to define the values $H_{135}$, $H_0$, $H_{45}$, $R_H$, and $S_H$ for the current pixel $P_{i-15,j-15}$:

$$H_{135} = \sum_{k=1}^{32} |P_{i-15,j-k} \text{ XNOR } P_{i-16,j-k-1}|$$

$$H_0 = \sum_{k=1}^{32} |P_{i-15,j-k} \text{ XNOR } P_{i-16,j-k-1}|$$

$$H_{45} = \sum_{k=1}^{32} |P_{i-15,j-k} \text{ XNOR } P_{i-16,j-k-1}|$$

$$R_H = \text{Max}[H_{135}, H_0, H_{45}] - \text{Min}[H_{135}, H_0, H_{45}]$$

$$S_H = 135° \text{ if Max}[H_{135}, H_0, H_{45}] = H_{135};$$
$$S_H = 0° \text{ if Max}[H_{135}, H_0, H_{45}] = H_0;$$
$$S_H = 45° \text{ if Max}[H_{135}, H_0, H_{45}] = H_{45}.$$

The vertical barcode detection value $R_V$ is determined by computing three vertical comparison values, $V_{135}$, $V_{90}$, and $V_{45}$. Each vertical comparison value is computed by comparing the value of each pixel of the current column 42 that is within the vertical window 36 to a pixel of the previous column 44. The comparison value is equal to the number of pixel intensity matches occurring for the comparison. More specifically, FIGS. 4D-4F illustrate the computation of the three vertical comparison values $V_{135}$, $V_0$, and $V_{45}$ for the current pixel $P_{i-15,j-15}$. As shown in FIGS. 4D-4F, the vertical window 36 covers pixels $P_{i-1,j-15}$ through $P_{i-32,j-15}$ of the current column 42 and pixels $P_{i-1,j-16}$ through $P_{i-32,j-16}$ of the previous column 44.

The first vertical comparison value $V_{135}$ is computed by comparing the intensity of pixels of the current column 42 within the vertical window 36 to the intensity of pixels of the previous column 44 wherein, for each comparison, the row of the pixel of the current column 42 is to the top of the row of the pixel of the previous column 44, as shown in FIG. 4D. For example, pixel $P_{i-1,j-15}$ is compared with pixel $P_{i,j-16}$. $V_{135}$ for the current pixel $P_{i-15,j-15}$ is equal to the number of pixel intensity matches occurring in the comparison illustrated in FIG. 4D. A relatively high number of pixel intensity matches occurring in the direction shown in FIG. 4D indicates the presence of a barcode with a 135° orientation, as shown in FIG. 5A.

Figure 5D:
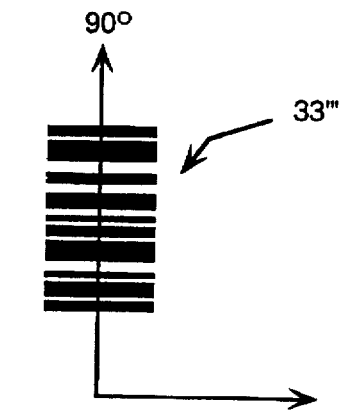

The second vertical comparison value $V_{90}$ is computed by comparing the intensity of pixels of the current column 42 within the vertical window 36 to the intensity of pixels of the previous column 44 wherein, for each comparison, the row of the pixel of the current column 42 is the same as the row of the pixel of the previous column 44, as shown in FIG. 4E. For example, pixel $P_{i-1,j-15}$ is compared with pixel $P_{i-1,j-16}$. $V_{90}$ for the current pixel $P_{i-15,j-15}$ is equal to the number of pixel intensity matches occurring in the comparison illustrated in FIG. 4E. A relatively high number of pixel intensity changes occurring in the direction shown in FIG. 4E indicates the presence of a barcode with a 90° orientation, as shown in FIG. 5D.

The third vertical comparison value $V_{45}$ is computed by comparing the intensity of pixels of the current column 42 within the vertical window 36 to the intensity of pixels of the previous column 44 wherein, for each comparison, the row of the pixel of the current column 42 is to the bottom of the row of the pixel of the previous column 44, as shown in FIG. 4F. For example, pixel $P_{i-1,j-15}$ is compared with pixel $P_{i-2,j-16}$. $V_{45}$ for the current pixel $P_{i-15,j-15}$ is equal to the number of pixel intensity changes occurring in the comparison illustrated in FIG. 4F. A relatively high number of pixel intensity changes occurring in the direction shown in FIG. 4F indicates the presence of a barcode with a 45° orientation, as shown in FIG. 5C.

The vertical barcode detection value $R_V$ is equal to the maximum of the three vertical comparison values, $V_{135}$, $V_{90}$, and $V_{45}$, minus the minimum of the three vertical comparison values, $V_{135}$, $V_{90}$, and $V_{45}$. The vertical barcode orientation value $S_V$ is equal to the orientation corresponding to the maximum of the three vertical comparison values, $V_{135}$, $V_{90}$, and $V_{45}$. Assigning a black pixel the value one and a white pixel the value zero allows the following mathematical expressions to define the values $V_{135}$, $V_{90}$, $V_{45}$, $R_V$, and $S_V$ for the current pixel $P_{i-15,j-15}$:

$$V_{135} = \sum_{k=1}^{32} |P_{i-k,j-15} \text{ XNOR } P_{i-k+1,j-16}|$$

$$V_{90} = \sum_{k=1}^{32} |P_{i-k,j-15} \text{ XNOR } P_{i-k+1,j-16}|$$

$$V_{45} = \sum_{k=1}^{32} |P_{i-k,j-15} \text{ XNOR } P_{i-k+1,j-16}|$$

$$R_V = \text{Max}[H_{135}, H_0, H_{45}] - \text{Min}[H_{135}, H_0, H_{45}]$$

$$R_V = 135° \text{ if Max}[V_{135}, V_{90}, V_{45}] = V_{135};$$
$$R_V = 90° \text{ if Max}[V_{135}, V_{90}, V_{45}] = V_{90};$$
$$R_V = 45° \text{ if Max}[V_{135}, V_{90}, V_{45}] = V_{45}.$$

Referring again to FIG. 2, the digital image 30 is divided into a matrix of 32 pixel by 32 pixel cells represented by the cell 35. As the digital video data signal 19 is passed through the omnidirectional barcode locator 20, a horizontal barcode detection value $R_H$ and a vertical barcode detection value $R_V$ are computed for each pixel within the cell 35. For each pixel, the horizontal barcode detection value $R_H$ is compared to a horizontal barcode detection threshold value $T(R_H)$ and the vertical barcode detection value $R_V$ is compared to a vertical barcode detection threshold value $T(R_V)$. A candidate value C is set to "1" for each pixel for which the horizontal barcode detection value $R_H$ is greater than the horizontal barcode detection threshold value $T(R_H)$ or the vertical barcode detection value $R_V$ is greater than the vertical barcode detection threshold value $T(R_V)$.

A totalized candidate value $T_{0,90}$ is then computed for the cell 35 by totalizing the candidate values C with a corresponding $D_C$ of 0° or 90° for the pixels within the cell. Candidate values C with a corresponding $D_C$ of 0° or 90° are considered to be mutually exclusive, so candidate values C with a corresponding $D_C$ of 90° add to the value $T_{0,90}$ whereas candidate values with a corresponding $D_C$ of 0° subtract from the value $T_{0,90}$. Thus, a positive value for $T_{0,90}$ indicates the presence of a barcode oriented at 90° whereas a negative value for $T_{0,90}$ indicates the presence of a barcode oriented at 0°. Similarly, a totalized candidate value $T_{45,135}$ is computed for the cell 35 by totalizing the candidate values C with a corresponding $D_C$ of 45° or 135° for the pixels within the cell. Candidate values C with a corresponding $D_C$ of 45° or 135° are considered to be mutually exclusive, so candidate values C with a corresponding $D_C$ of 45° add to the value $T_{45,135}$ whereas candidate values with a corresponding $D_C$ of 135° subtract from the value $T_{45,135}$. Thus, a positive value for $T_{45,135}$ indicates the presence of a barcode oriented at 45° whereas a negative value for $T_{45,135}$ indicates the presence of a barcode oriented at 135°.

The magnitude of the totalized candidate values $T_{0,90}$ and $T_{45,135}$ are then compared to a cell threshold value T(M) to determine whether the presence of a barcode is detected. If the magnitude of either totalized candidate value $T_{0,90}$ or $T_{45,135}$ is greater than the cell threshold value T(M), the cell barcode indication value M is set to "TRUE" for the cell 35. When the cell barcode indication value is "TRUE," the barcode detection signal 21 indicates the detection of a barcode within the cell 35. As the cell barcode indication value M may have one of two values (true or false), one bit is required to represent the barcode detection signal 21. The host computer 23 responds to the M=TRUE barcode detection signal 21 from the omnidirectional barcode locator 20 by storing the portion of the image 30 that is within and near the cell 35 in the mass storage memory 24. The process described above is performed in real-time for each cell of the image 30, thus allowing the host computer 23 to store only those cells of the image 30 that correspond to a barcode detection, i.e., when the barcode detection signal 21 indicates a cell barcode indication value M=TRUE.

The following mathematical expressions define the values C, $T_{0,90}$, $T_{45,135}$, D, and M:

For each pixel: C=1 if $R_V > T(R_V)$ or $R_H > T(R_H)$, else C=0

For each cell:

$$T_{0,90} = \sum_{k=1}^{32} \sum_{w=1}^{32} \{C_{k,w} \text{ if } D_C = 90; -C_{k,w} \text{ if } D_C = 0; 0 \text{ otherwise}\}$$

$$T_{45,135} = \sum_{k=1}^{32} \sum_{w=1}^{32} \{C_{k,w} \text{ if } D_C = 45; -C_{k,w} \text{ if } D_C = 135; 0 \text{ otherwise}\}$$

D = 0 if $|T_{0,90}| > |T_{45,135}|$ and $T_{0,90} < 0$;
D = 90 if $|T_{0,90}| > |T_{45,135}|$ and $T_{0,90} > 0$;
D = 45 if $|T_{0,90}| < |T_{45,135}|$ and $T_{0,90} < 0$;
D = 135 if $|T_{0,90}| < |T_{45,135}|$ and $T_{0,90} > 0$.

M = "TRUE" if $|T_{0,90}|$ or $|T_{45,135}| > T(M)$, else M = "FALSE".

As the cell barcode indication value M is determined for the cell 35, the omnidirectional barcode locator 20 simultaneously determines the approximate orientation of a barcode detected within the cell 35. As the digital video data signal 19 is passed through the omnidirectional barcode locator 20, a horizontal barcode orientation value $S_H$ and a vertical barcode orientation value $S_V$ are computed for each pixel within the cell 35. For each pixel, the horizontal barcode orientation value $S_H$ indicates one of three relative orientations: 135°, 0°, or 45°. The vertical barcode orientation value $S_V$ similarly indicates one of three relative orientations: 135°, 90°, or 45°. Barcodes with orientations of 135°, 0°, 45° and 135° are illustrated by the barcodes 33, 33', 33", and 33'" in FIGS. 5A, 5B, 5C and 5D, respectively, as described above.

A candidate orientation value $D_C$ is computed for each pixel of the cell 35. Specifically, if $R_H > R_V$, $D_C$ is set to the value of $S_H$, otherwise $D_C$ is set to the value of $S_V$. A totalized candidate value $T_{0,90}$ is computed for the cell 35 by totalizing the number of pixels within the cell for which $D_C = 0°$ and $D_C = 90°$. Similarly, a totalized candidate value $T_{45,135}$ is computed for the cell 35 by totalizing the number of pixels within the cell for which $D_C = 45°$ and $D_C = 135°$. In the computation of $T_{0,90}$ and $T_{45,135}$, only the pixels with a candidate value C=1 are considered; pixels for which the candidate value C=0 are ignored. The cell barcode orientation value D is set to the predominant direction of $D_C$.

As the cell barcode orientation value D may have one of four possible values (45°, 135°, 90°, or 0°), two bits are required to represent the barcode orientation signal 22. The host computer 23 responds to a barcode detection signal 21 "M=TRUE" from the omnidirectional barcode locator 20 by storing a representation of the cell barcode orientation value D, along with the portion of the image 30 that is within the cell 35, in the mass storage memory 24. The process described above is performed in real-time for each cell of the image 30, thus allowing the host computer 23 to store a representation of the cell barcode orientation value D for each cell of the image 30 that correspond to a barcode detection, i.e., whenever the barcode indication value M=TRUE.

The preferred embodiments of the present invention perform acceptably when the density of the image 30 is approximately 100 DPI (39 dots per cm), the size of the cell 35 is 32 pixels by 32 pixels (1,024 pixels per cell), the size of the vertical window 36 is 2 pixels by 32 pixels, the size of the horizontal window 37 is 32 pixels by 2 pixels, the horizontal and vertical barcode detection threshold values $T(R_H)$ and $T(R_V)$ are set to eight (derived as 25% of 32), and the cell threshold value T(M) is set to 512 (derived as 50% of 32×32). For $H_{45}$ and $H_{135}$, the offset between the pixels of the current row 38 and the pixels of the previous row 40 is one pixel, and for $V_{45}$ and $V_{135}$, the offset between the pixels of the current column 42 and the pixels of the previous column 44 is one pixel. In addition, the current row 38 preferably immediately follows the previous row 40, and the current column 42 preferably immediately follows the previous column 44. All of the above-mentioned parameters may be varied somewhat without unduly affecting the performance of the preferred embodiments of the present invention. It should also be understood that the values $T(R_H)$ and $T(R_V)$ need not be the same and that the dimensions of the windows 36 and 37 need not correspond in any particular manner to each other or to the dimensions of the cell 35.

Description of Preferred Apparatus

As described above, it is an aspect of the preferred embodiments of the present invention to provide an efficient method for determining the location and approximate orientation of barcodes. Referring again to FIG. 1, a further aspect of the preferred embodiments of the present invention is to provide a omnidirectional barcode locator 20 that can determine the location and approximate orientation of barcodes on packages moving on the conveyor 12 in real-time. The host computer 23 stores the digital video signal 26 in the mass storage memory 24 in response to the barcode indication signal 21 produced by the omnidirectional barcode locator 20. The omnidirectional barcode locator 20 thus allows the host computer 23 to store only those cells of the digital video signal 26 that contain barcode data. The host computer 23 also stores an indication of the orientation of each detected barcode in the mass storage memory 24 in response to the barcode orientation signal 22 produced by the omnidirectional barcode locator 20.

The data flow rate of the digital video signal 26 is approximately 40 million pixels per second. Conventional systems for determining the location and orientation of barcodes, such as those implemented by a sequential von Neumann type computing device, do not process data quickly enough to produce real-time barcode indication and orientation signals in response to a data flow rate of approximately 40 million pixels per second. It is therefore a further aspect of the preferred embodiments of the present invention to provide a computing device that processes digital video data such as the digital video signal 26 quickly enough to perform effectively in the over-the-belt optical barcode reader system 10 that provides the operating environment for the preferred embodiments of the present invention.

Figure 6:
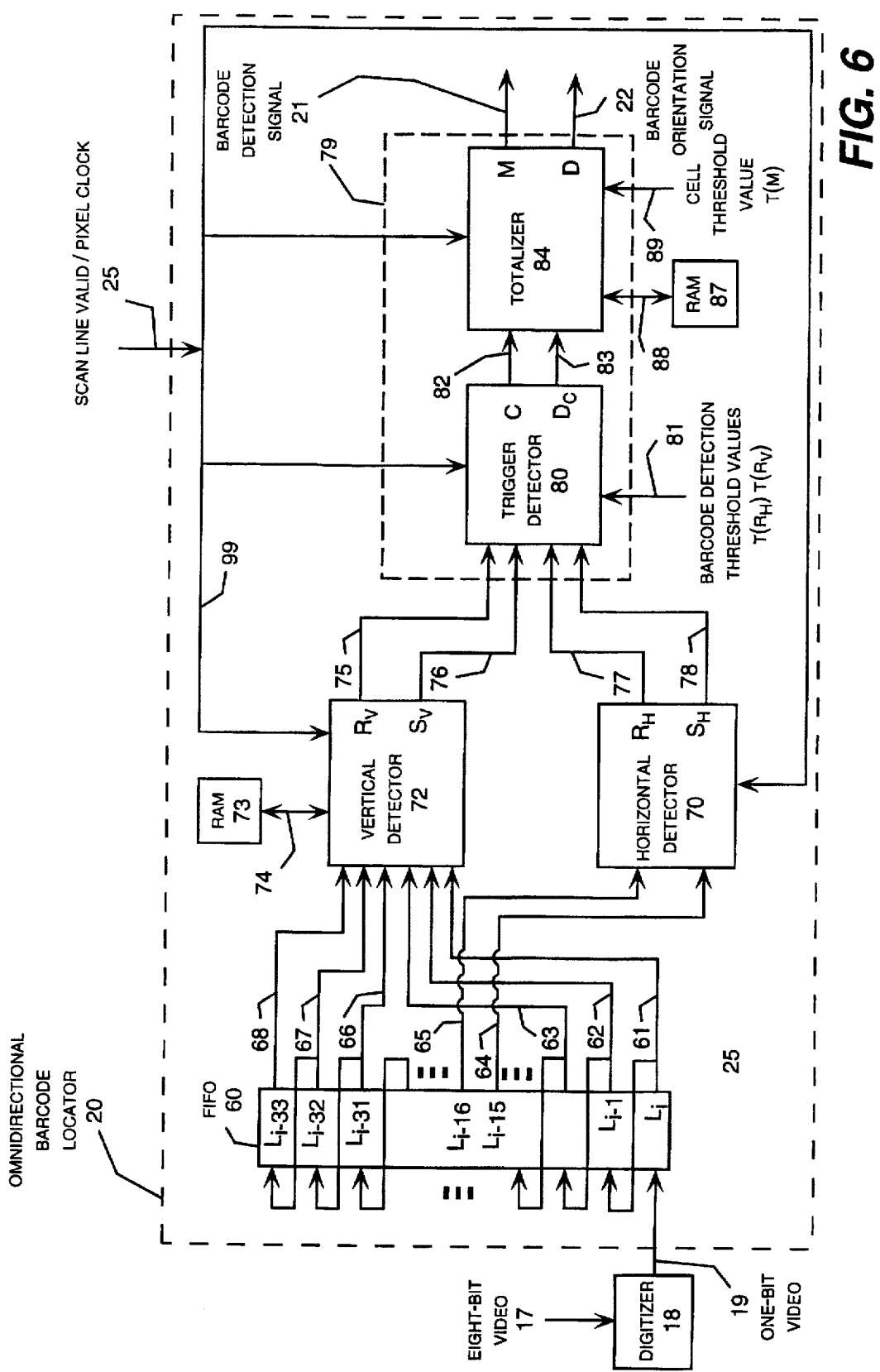
FIG. 6 is a functional block diagram illustrating the preferred application specific integrated circuit for an omnidirectional barcode locator.

FIG. 6 is a functional block diagram illustrating the preferred application specific integrated circuit for an omnidirectional barcode locator 20. The digital video signal 19, which is a one-bit representation of the eight-bit video signal 26 produced by the CCD camera 16, provides the input data source for the omnidirectional barcode locator 20. The digital video signal 19 is received by a buffer memory 60. The buffer memory 60 includes 34 data lines, $L_i$ through $L_{i-33}$, wherein each data line accesses a shift register including 4,096 bits—one bit corresponding to each pixel of the CCD camera 16. Each register may therefore contain a bit map representation of one scan line of the image 30 produced by one cycle of the CCD camera 16. The lines $L_i$ through $L_{i-33}$ of the buffer memory 60 correspond to the 32 pixel height of the vertical window 37, plus one pixel above and one pixel below the vertical window 37 as shown on FIGS. 4D–4F. As shown in FIG. 6, each data line $L_i$ through $L_{i-33}$ is connected to the next succeeding data line so that each time a new scan line is read into the buffer memory 60, the preceding 33 scan lines each shift to the next succeeding register. The buffer memory 60 may be a conventional first-in-first-out (FIFO) buffer constructed from commercially available chips such as two 4k by 18 bit model IDT-72245 FIFO chips manufactured by IDT Corporation. The buffer memory 60 may alternatively be implemented by a controller and a static RAM memory resource.

The data lines $L_{i-15}$ and $L_{i-16}$ of the buffer memory 60 are connected to a horizontal detector 70 by way of the circuit board conductors 64 and 65, respectively. The horizontal detector 70 determines a horizontal barcode detection value $R_H$ and a horizontal barcode orientation value $S_H$, as described above, for each pixel introduced to the horizontal detector 70 from $L_{i-15}$ of the buffer memory 60. More specifically, $L_{i-15}$ provides pixels of the current row 38 and $L_{i-16}$ provides pixels of the previous row 40, as shown on FIGS. 4A–4C. The operation of the horizontal detector 70 is described with more particularity with respect to FIGS. 7 and 9–11 below. Selection of data lines $L_{i-15}$ and $L_{i-16}$ for connection to the horizontal detector 70 effects positioning of the horizontal window 36 in the center of the vertical window 37 as shown in FIG. 3B. The horizontal detector 70 may be implemented on an EPM7160E FPGA chip manufactured by Altera Corporation.

The data lines $L_i$ through $L_{i-2}$ and $L_{i-31}$ through $L_{i-33}$ of the buffer memory 60 are connected to a vertical detector 72 by way of the circuit board conductors 61–63 and 66–68, respectively. The vertical detector 72 is connected to a RAM 73 by way of a circuit board conductor 74. The RAM 73 provides a memory resource for use in connection with the operation of the vertical detector 72. The vertical detector 72 determines a vertical barcode detection value $R_V$ and a vertical barcode orientation value $S_V$, as described above, for each pixel introduced to the vertical detector 72. The data from lines $L_i$ through $L_{i-2}$ allows the vertical detector 72 to keep track of pixels entering the vertical window 37, and the data from lines $L_{i-31}$ through $L_{i-33}$ allows the vertical detector 72 to keep track of pixels exiting the vertical window 37. The operation of the vertical detector 72 is described with more particularity with respect to FIGS. 7 and 9–11 below. The vertical detector 72 may be implemented on an EPM7160E FPGA chip manufactured by Altera Corporation.

The output values of the vertical detector 72, $R_V$ and $S_V$, and the output values of the horizontal detector 70, $R_H$ and $S_H$, are provided to a trigger detector 80 by way of the circuit board conductors 75–78, respectively. The trigger detector 80 also receives the barcode detection threshold values $T(R_H)$ and $T(R_V)$ from an external programming source, such as a general purpose microprocessor, by way of a circuit board conductor 81. The trigger detector 80 compares the values $R_V$ and $R_H$ to the barcode detection threshold values $T(R_H)$ and $T(R_V)$, respectively, to determine a candidate value C for each pixel of the image 30. The trigger detector 80 also uses the values $S_V$ and $S_H$ to compute a candidate orientation value $D_C$ for each pixel of the image 30, as described previously. The operation of the trigger detector 80 with respect to the values $R_V$ and $S_V$ are delayed 15 clock cycles to effect positioning of the vertical window 37 in the center of the horizontal window 36, as shown in FIG. 3B. The operation of the trigger detector 80 is described with more particularity with respect to FIG. 15 below.

The candidate value C and the candidate orientation value $D_C$ for each pixel of the image 30 are transmitted to a totalizer 84 by way of communication links 82 and 83, respectively. The totalizer 84 is connected to a RAM 87 by way of a circuit board conductor 88. The RAM 87 provides a memory resource for use in connection with the operation of the totalizer 84. The totalizer 84 receives the cell threshold value T(M) from an external programming source by way of a circuit board conductor 89. The totalizer 84 computes a totalized candidate value $T_C$ and a totalized candidate orientation value $T_D$ for each cell of the image 30, as described previously. The totalizer 84 further sets the barcode indication value M=TRUE on the barcode detection signal 21, and the cell barcode orientation value $D=T_D$ on the barcode orientation signal 22, when the totalized candidate value $T_C$ is greater than the cell threshold value T(M). Otherwise, the cell barcode indication value M is set to "FALSE." The operation of the totalizer 84 is described with more particularity with respect to FIGS. 16–17 below. The trigger detector 80 and the totalizer 84 may be implemented on an EPM7160E FPGA chip manufactured by Altera Corporation, indicated at 79 in FIG. 6. The communication links 82 and 83 are therefore internal connections of the FPGA chip that are controlled by programmable switches.

Figure 7:
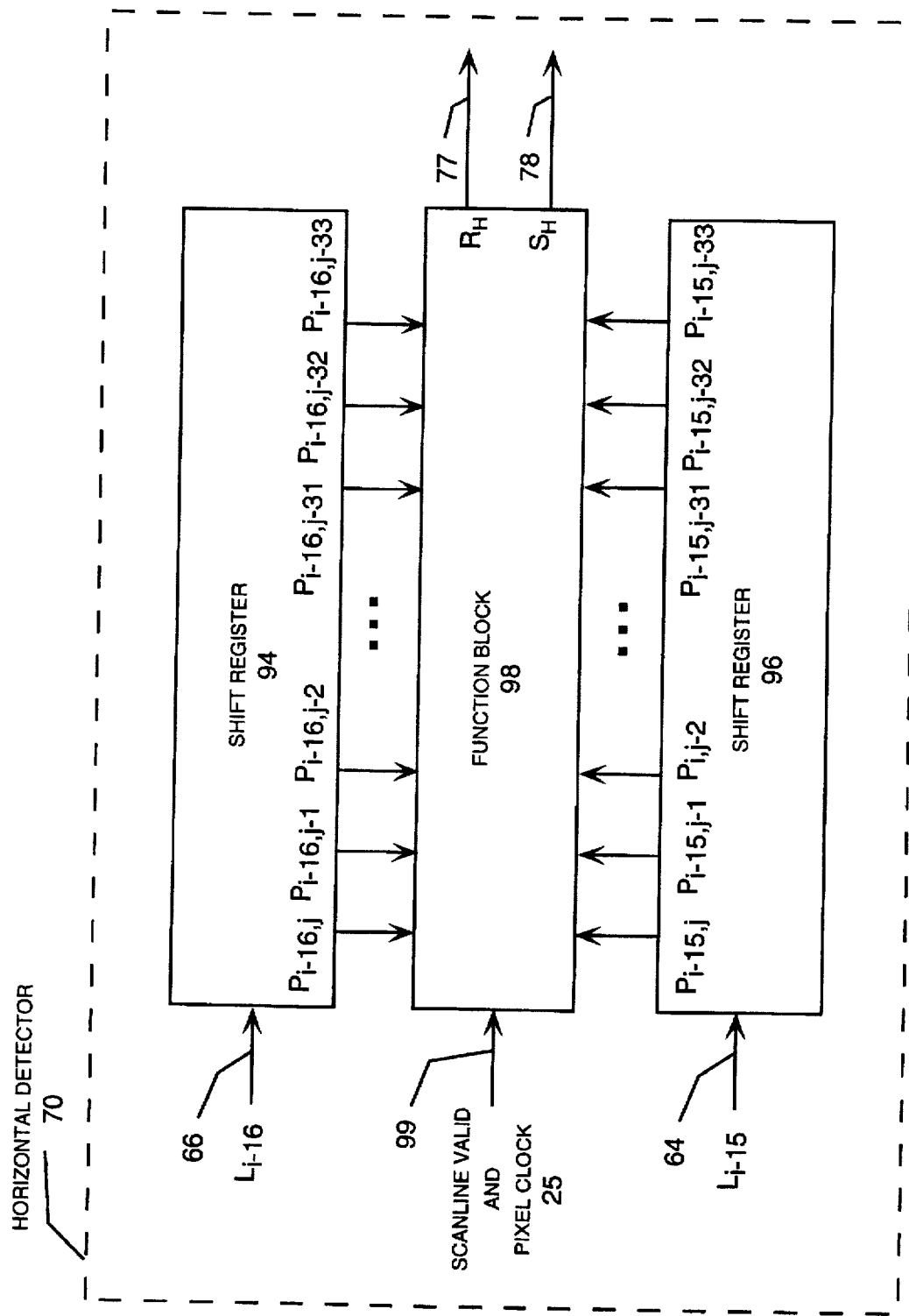
FIG. 7 is a functional block diagram of a horizontal detector incorporated into the preferred application specific integrated circuit for an omnidirectional barcode locator.
Figure 8:
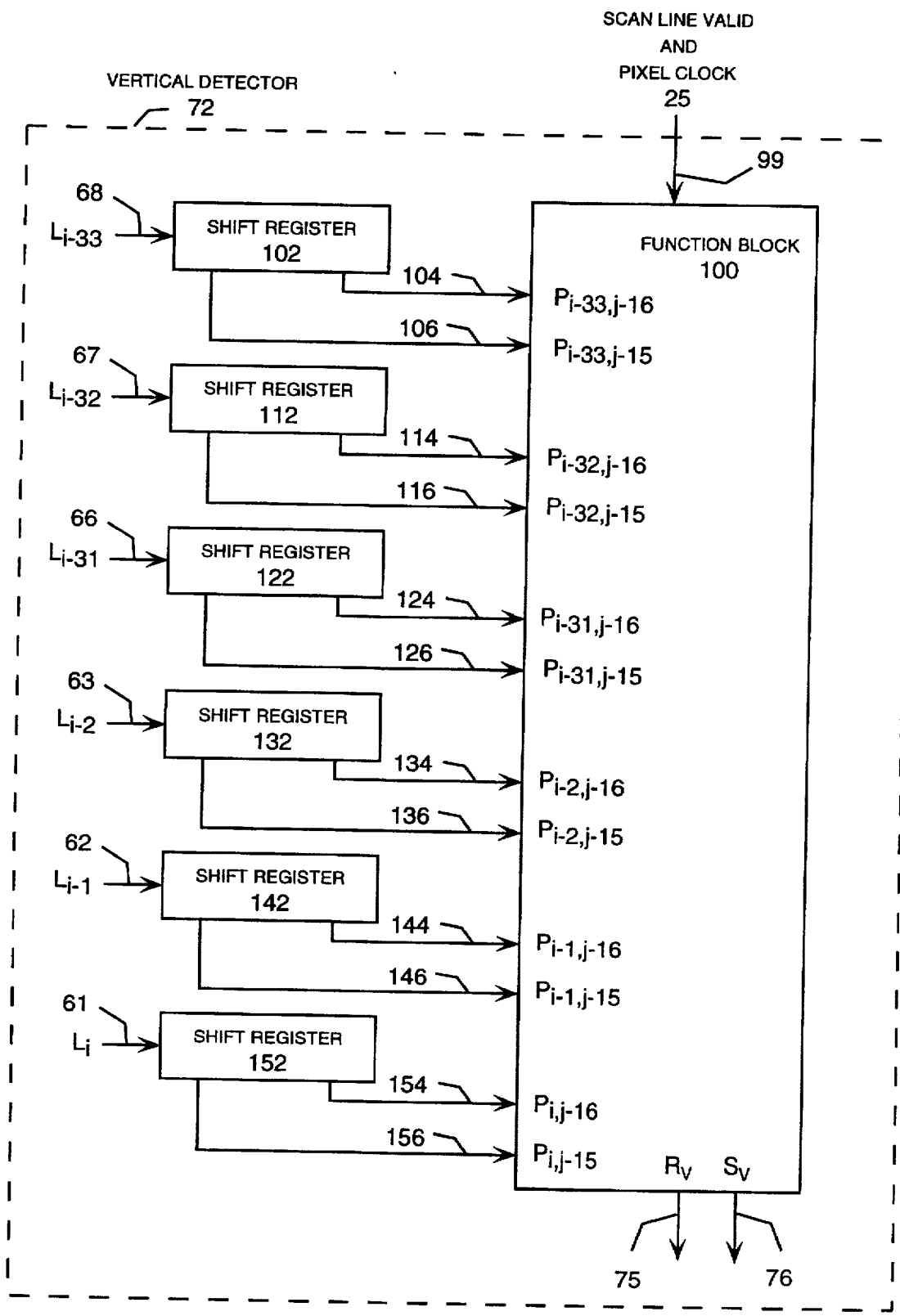
FIG. 8 is a functional block diagram of a vertical detector incorporated into the preferred application specific integrated circuit for an omnidirectional barcode locator.

FIGS. 7 and 8 the show the positions of pixel data in the preferred apparatus at the point in time when a particular pixel $P_{i,j}$ is read into the omnidirectional barcode locator 20, and the pixel $P_{i-15, j-15}$ is therefore the current pixel, as shown in FIGS. 3 and 4. FIG. 7 is a functional block diagram of the horizontal detector 70 incorporated into the preferred application specific integrated circuit for the omnidirectional barcode locator 20. The horizontal detector 70 includes two shift registers 94 and 96 and a function block 98. The shift register 94 receives data defining a string of pixels by way of the circuit board conductor 66 which connects the horizontal detector 70 with the line $L_{i-16}$ of the buffer memory 60. The shift register 94 includes 34 registers whereby each register contains a pixel of the previous row 40 that is within the horizontal window 37, plus one pixel before and one pixel after the horizontal window 37, as shown on FIGS. 3B and 4A–C. A new pixel is read into the shift register 94 each clock cycle and the pixels within the shift register 94 each shift one pixel to the right.

Similarly, the shift register 96 receives data defining a stream of pixels by way of the circuit board conductor which is connected to the line $L_{i-15}$ of the buffer memory 60. The shift register 96 includes the pixels of the current row 38 that are within the horizontal window 37, plus one pixel before and one pixel after the horizontal window 37 as shown on FIGS. 3B and 4A–C. The shift register 96 receives a new pixel each clock cycle, and the pixels within the shift register each shift one register to the right.

The shift registers 94 and 96 each provide the function block 98 with pixel data. Specifically, each pixel is represented by a one bit value, i.e., zero equal black, one equal white. The function block 98 also receives the scan line valid and pixel clock signals 25 by way of the circuit board conductor 99. The shift registers 94 and 96 effectively provide the pixel data depicting on FIGS. 4A–C to the function block 98 which performs the comparisons illustrated on FIGS. 4A–C. The function block 98 produces as output values the horizontal barcode detection value $R_H$ and the horizontal barcode orientation value $S_H$ described previously. These values are provided to the trigger detector 80 by way of circuit board conductor 75 and 76 as shown on FIG. 6.

FIG. 8 is a functional block diagram of the vertical detector 72 incorporated into the preferred application specific integrated circuit for the omnidirectional barcode locator 20. The vertical detector 72 includes six shift registers 102, 112, 122, 132, 142, and 152 and a function block 100. The top three shift registers 102, 112, and 122 are connected by way of circuit conductor 68, 67, and 66, respectively, to receive data from lines $L_{i-33}$, $L_{i-32}$ and $L_{i-31}$ of the buffer memory 60, respectively. The lower three shift registers 132, 142, and 152 are connected by way of the circuit board conductors 63, 62, and 61, respectively, to receive data from lines $L_{i-2}$, $L_{i-1}$, and $L_i$ of the buffer memory 60, respectively. The function block 100 also receives the scan line valid and pixel clock signals 25 by way of the circuit board conductor 99.

The shift register 102 provides pixel data to the function block 100 regarding the pixel $P_{i-33,j-16}$ by way of communication channel 104. The shift register 102 also provides pixel information to the function block 100 regarding pixel $P_{i-33,j-15}$ by way of communication channel 106.

The shift register 112 provides pixel information to the function block 100 regarding $P_{i-32,j-16}$ by way of communication channel 114. The shift register 112 also provides pixel information to the function block 100 regarding pixel $P_{i-32,j-15}$ by way of communication channel 116.

The shift register 122 provides pixel information to the function block 100 regarding pixel $P_{i-31,j-16}$ by way of communication channel 124. The shift register 122 also provides pixel information to the function block 100 regarding pixel $P_{i-31,j-15}$ by way of the communication channel 126.

The shift register 132 provides the function block 100 with pixel information regarding the pixel $P_{i-2,j-16}$ by way of communication channel 134. The shift register 132 also provides pixel information to the function block 100 regarding pixel $P_{i-2,j-15}$ by way of the communication channel 136.

The shift register 142 provides pixel information to the function block 100 regarding the pixel $P_{i-1,j-16}$ by way of the communication channel 144. The shift register 142 also provides information to the function block 100 regarding pixel $P_{i-1,j-15}$ by way of the communication channel 146.

The shift register 152 provides pixel information to the function block 100 regarding pixel $P_{i,j-16}$ by way of the communication channel 154. The shift register 152 also provides pixel information to the function block 100 by way of the communication channel 156.

The function block 100 uses the pixel information provided by the shift registers 102, 112, 122, 132, 142, and 152 to compute the vertical barcode detection value $R_V$ and the vertical barcode orientation value $S_V$ which are provided to the trigger detector 80 by way of the circuit board conductors 77 and 78, respectively, as shown on FIG. 6. The function block 100 effectively computes the comparisons shown on FIGS. 4D–F.

It should be understood that the function block 100, unlike the function block 98, does not have pixel data presented to it simultaneously for each pixel within the vertical window 36. Therefore, the function block 100 cannot directly compute the comparisons shown on FIGS. 4D–F. The function block 100 therefore keeps track of the pixel data entering and leaving the vertical window 36 and stores data regarding the intermediate pixels in the RAM 73. The vertical comparison values $V_{135}$, $V_{90}$, and $V_{45}$ for the current pixel $P_{i-15,j-15}$, are computed by taking the vertical comparison values computed for the pixel $P_{i-14,j-15}$ (when it was the current pixel) and taking account of the pixels that enter and leave the vertical window 36 when it is effectively shifted up one row. The horizontal window 37 and the vertical window 36 are effectively sliding horizontally along an entire scan line of 4,096 pixels, and then shifting up one row and sliding along the next succeeding scan line. Therefore, the function block 100 stores the results for each pixel along the scan line in the RAM 73 for use during the processing of the next scan line.

The preceding discussion describes an apparatus for implementing the omnidirectional barcode locator 20 including three FPGA chips. Alternatively, the entire omnidirectional barcode locator 20 may be implemented on a single FPGA chip having sufficient computing capacity, such as Altera's EPF10K50 FPGA chip.

Description of Operation of the Preferred Apparatus
With Reference to Logical Flow Diagrams The logical flow diagrams described below illustrate the methodology of the function block 98 of the horizontal detector 70, the function block 100 of the vertical detector 72, the trigger detector 80, and the totalizer 84 with more particularity. The logical flow diagrams of FIGS. 9–14 correspond to FIGS. 7 and 8 in that they depict the positions of pixels in the preferred apparatus at the point in time when a particular pixel $P_{i,j}$ is read into the omnidirectional barcode locator 20, and the pixel $P_{i-15,j-15}$ is therefore the current pixel, as shown in FIGS. 3 and 4. At some point, each pixel of the digital image 30 (excluding the last 15 pixels of each scan line) becomes the current pixel as the digital video signal 19 is processed by the omnidirectional barcode locator 20.

It will be appreciated that the logical flow diagrams illustrate a preferred method for implementing the present invention and that many changes and variations may be made to the illustrated method within the scope and spirit of the present invention. It will also be appreciated that the logical flow diagrams define an allocation of programming tasks among the three FPGA chips of the preferred apparatus described above with reference to FIG. 6. Many different allocations of programming tasks among the various chips, and many different allocations of programming tasks among different FPGA chip configurations, may be similarly defined within the scope and spirit of the present invention.

Figure 9:
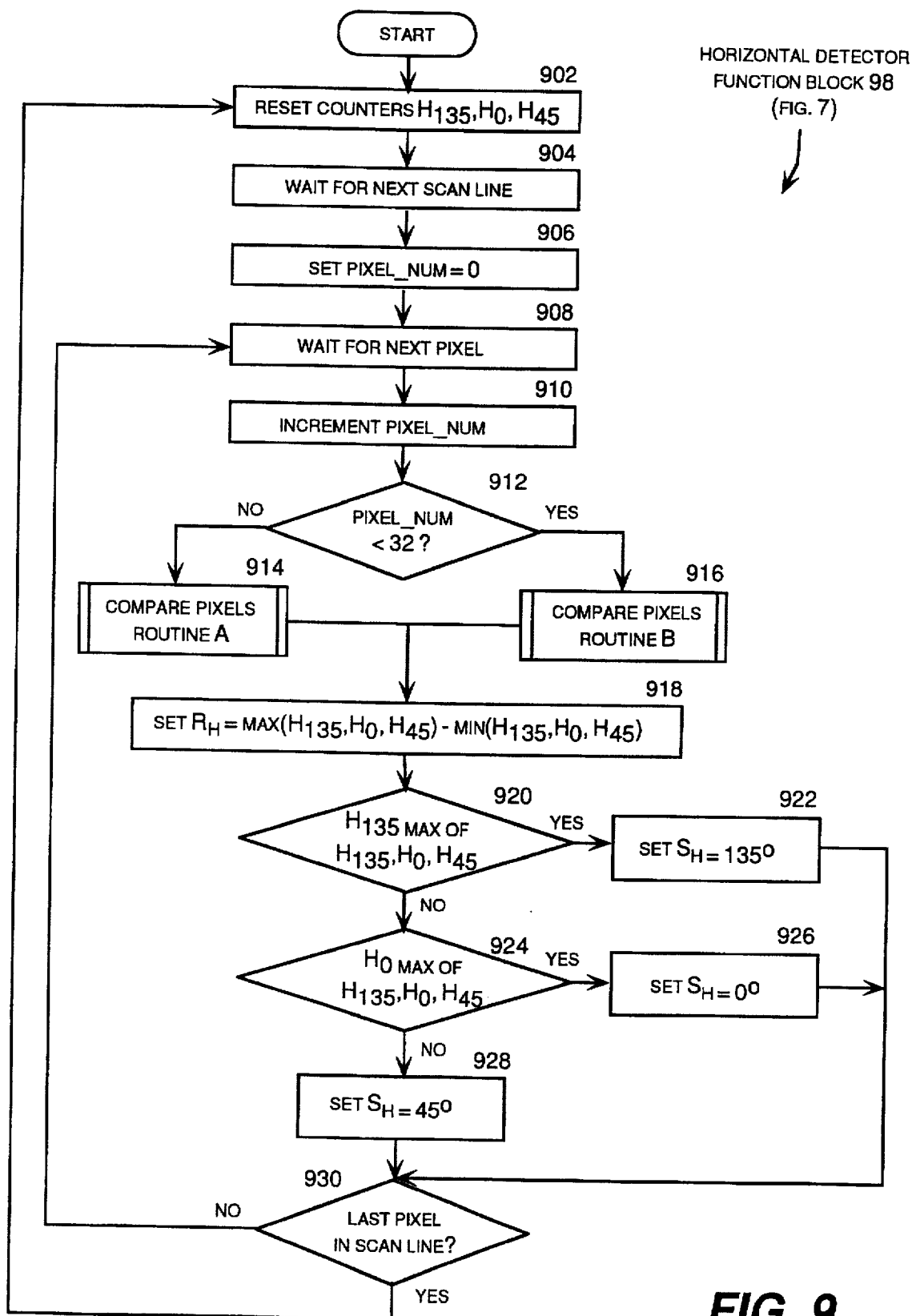
FIG. 9 is a logical flow diagram of a computer-implemented process for a horizontal detector.

FIG. 9 is a logical flow diagram of a computer-implemented process for the function block 98 of the horizontal detector 70. In step 902, counters corresponding to the horizontal comparison values $H_{135}$, $H_0$, and $H_{45}$ are reset to zero. In step 904, the function block 98 waits for the next scan line. In step 906, a pixel number counter referred to herein as pixel_NUM is set to 0. In step 908, the function block 98 waits for the next pixel of the current scan line. Upon receiving the next pixel, the pixel counter pixel_NUM is incremented by one in step 910. In decision step 912, it is determined whether the pixel counter pixel_NUM is less then 32. If the pixel_NUM is not less than 32, the "NO" branch is followed to routine 914. If the pixel_NUM is less than 32, the "YES" branch followed to the routine 916.

Two different routines, 914 and 916, are used for comparing pixels because, when the pixel_NUM is less than 32, there are no pixels leaving the horizontal window 37. Therefore, in routine 916 which is applied when pixel_NUM is less than 32, the counters $H_{135}$, $H_0$, and $H_{45}$ can only be incremented each time the pixel counter pixel_NUM is incremented. On the other hand, in routine 914, which is applied when pixel_NUM is not less than 32, the counters $H_{135}$, $H_0$, and $H_{45}$ may be incremented or decremented each time the pixel counter pixel_NUM is incremented. The routines 914 and 916 will be described in greater detail with respect to FIGS. 10 and 11, respectively.

The routines 914 and 916 both return to step 918 in which the horizontal barcode detector value $R_H$ is set equal to maximum of $H_{135}$, $H_0$, and $H_{45}$ minus the minimum of $H_{135}$, $H_0$, and $H_{45}$. In decision step 920, it is determined whether $H_{135}$ is the maximum of the three horizontal comparison values $H_{135}$, $H_0$, and $H_{145}$. If $H_{135}$ is the maximum, the "YES" branch is followed to step 922 in which the horizontal barcode orientation value $S_H$ is set to 135°. If $H_{135}$ is not the maximum, the "NO" branch is followed to step 924 in which it is determined whether $H_0$ is the maximum of the horizontal comparison values $H_{135}$, $H_0$ and $H_{45}$. If $H_0$ is the maximum, the "YES" branch is followed to step 926 in which the horizontal barcode orientation value $S_H$ is set to 0°. If $H_0$ is not the maximum, the "NO" branch is followed to step 928 in which the horizontal barcode orientation value is set to 45°.

Steps 922, 926, and 928 are each followed by step 930 in which it is determined whether the current pixel is the last pixel in the current scan line. If the current pixel is not the last pixel in the current scan line, the "NO" branch is followed back to step 908 in which the function block 98 waits for the next pixel. If the current pixel is the last pixel in the scan line, the "YES" branch is followed back to step 902 in which the counters for the horizontal comparison values $H_{135}$, $H_0$, and $H_{145}$ are reset to zero. It will be appreciated that the computer-implemented process illustrated in FIG. 9 produces a horizontal barcode detection value $R_H$ and a horizontal barcode orientation value $S_H$ for each pixel of the pixelized image 30.

Figure 10:
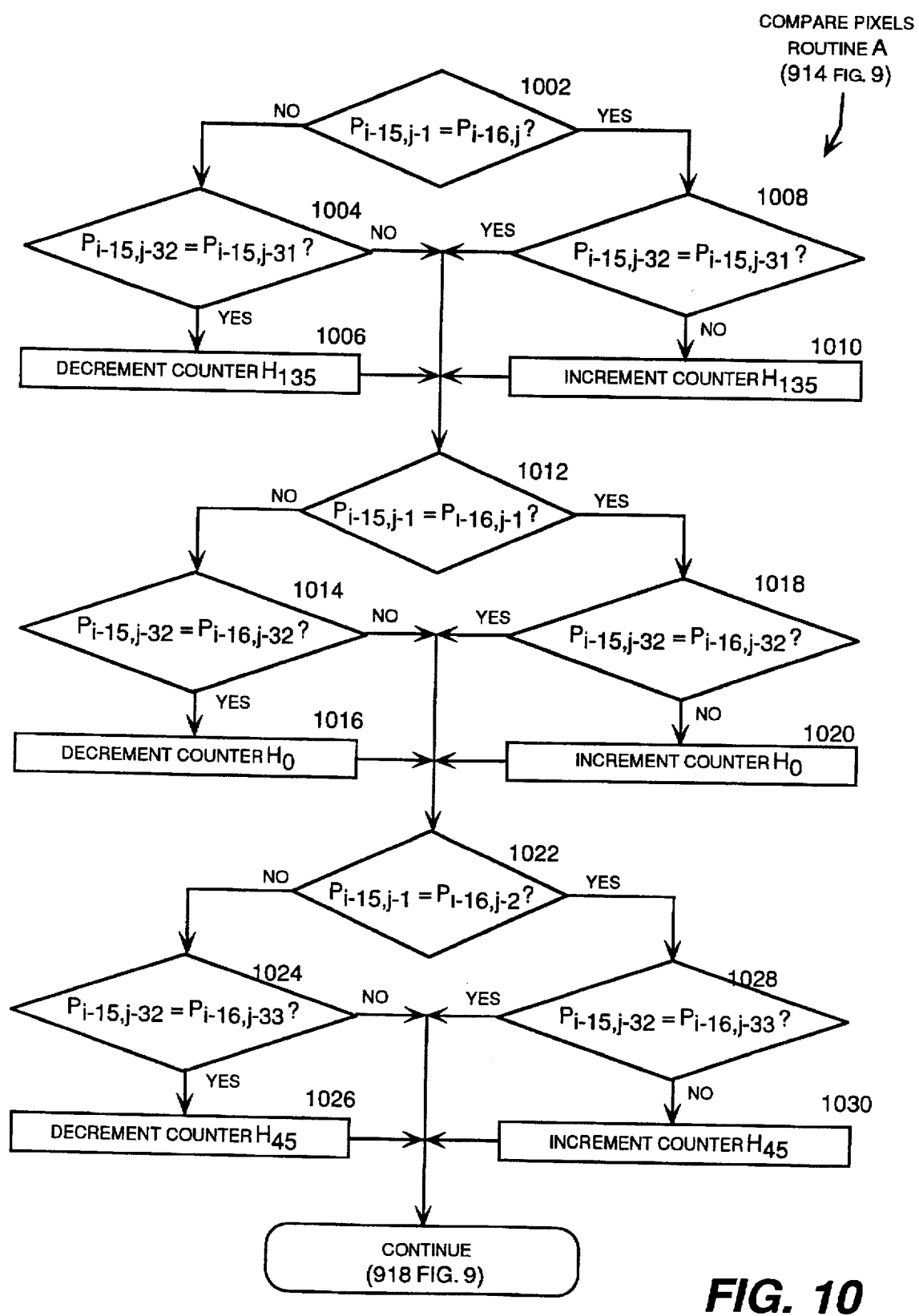
FIG. 10 is a logical flow diagram of a computer-implemented routine for computing horizontal comparison values.

FIG. 10 is a logical flow diagram of the computer-implemented routine 914 which is applied when the pixel counter pixel_NUM is not less than 32. In step 100, it is determined whether pixel $P_{i-15,j-1}$ is equal to $P_{i-16,j}$. In other words, step 1002 determines whether the pixel shift of the function block 98 caused by reading the pixel $P_{i,j}$ into the omnidirectional barcode locator 20 caused a 135° pixel match to enter the horizontal window 37, as shown on the right hand side of FIG. 4A. If the answer to the inquiry of step 1002 is no, the "NO" branch is followed from step 1002 to step 1004 in which it is determined whether the pixel $P_{i-15,j-32}$ is equal to the pixel $P_{i-15,j-31}$. In other words, it is determined whether the pixel shift of the function block 98 caused by reading the pixel $P_{i,j}$ into the omnidirectional barcode locator 20 caused a 135° pixel match to exit the horizontal window 37, as shown on the left hand side of FIG. 4A. If the answer to the inquiry of step 1004 is yes, the "YES" branch is followed to step 1006 in which the counter for the horizontal barcode comparison value $H_{135}$ is decremented. It should be understood that the counter for the comparison value $H_{135}$ is decremented because the pixel shift of the function block 98 caused by reading the pixel $P_{i,j}$ into the omnidirectional barcode locator 20 caused a 135° pixel match to exit the horizontal window 37 but did not cause a 135° pixel match to enter the horizontal window 37. If the answer to the inquiry of step 1004 is no, the counter for the horizontal comparison value $H_{135}$ is neither incremented nor decremented because the pixel shift of the function block 98 caused by reading the pixel $P_{i,j}$ into the omnidirectional barcode locator 20 did not caused a 135° pixel match to enter or exit the horizontal window 37.

Referring back to the decision step 1002, if the answer to the inquiry of step 1002 is yes, the pixel shift of the function block 98 caused by reading the pixel $P_{i,j}$ into the omnidirectional barcode locator 20 caused a 135° pixel match to enter the horizontal window 37, as shown on the right hand side of FIG. 4A. If the answer to the inquiry of step 1002 is yes, the "YES" branch is followed to step 1008 in which it is determined whether the pixel $P_{i-15,j-32}$ is equal to the pixel $P_{i-15,j-31}$, indicating that the pixel shift of the function block 98 caused by reading the pixel $P_{i,j}$ into the omnidirectional barcode locator 20 caused a 135° pixel match to exit the horizontal window 37, as shown on the left hand side of FIG. 4A.

If the answer to the inquiry of step 1008 is yes, the horizontal comparison value $H_{135}$ is neither incremented nor decremented because the pixel shift of the function block 98 caused by reading the pixel $P_{i,j}$ into the omnidirectional barcode locator 20 caused a 135° pixel match to both enter and exit the horizontal window 37. If the answer to the inquiry of step 1008 is no, the "NO" branch is followed to step 1010 in which the counter for the horizontal comparison value $H_{135}$ is incremented because the pixel shift of the function block 98 caused by reading the pixel $P_{i,j}$ into the omnidirectional barcode locator 20 caused a 135° pixel match to enter the horizontal window 37, but did not cause a 135° pixel match to exit the horizontal window 37.

It will be appreciated that the steps 1002 through 1010 illustrate a method for determining whether the pixel shift of the function block 98 caused by reading the pixel $P_{i,j}$ into the omnidirectional barcode locator 20 caused a "net gain or reduction" in the number of 135° pixel matches occurring in the portion of the current row 38 that is within the horizontal window 37 as shown in FIG. 4A. For convenience, this method will be referred below to as the "Net Gain/Reduction Method" for computing the horizontal comparison value $H_{135}$ as shown in FIG. 4A. The same "Net Gain/Reduction Method" is used to compute the other comparison values $H_0$, $H_{45}$, $V_{135}$, $V_{90}$, and $V_{45}$, except that the pixel comparison are as shown in FIGS. 4B–F, respectively. The "Net Gain/ Reduction Method" will therefore not be described with respect to the other comparison values $H_0$, $H_{45}$, $V_{135}$, $V_{90}$, and $V_{45}$.

In steps 1012 through 1020, it is determined whether the counter for the horizontal comparison value $H_0$ should be incremented or decremented using the "Net Gain/Reduction Method." Similarly, in steps 1022 through 1030 it is determined whether the horizontal comparison value $H_{45}$ should be incremented or decremented using the "Net Gain/ Reduction Method." It will therefore be appreciated that FIG. 10 illustrates a method for incrementing or decrementing the counters for the horizontal comparison values $H_{135}$, $H_0$ and $H_{45}$ to reflect the net gain in pixel matches within the horizontal window 37 in the 135°, 0°, and 45° directions, respectively.

Figure 11:
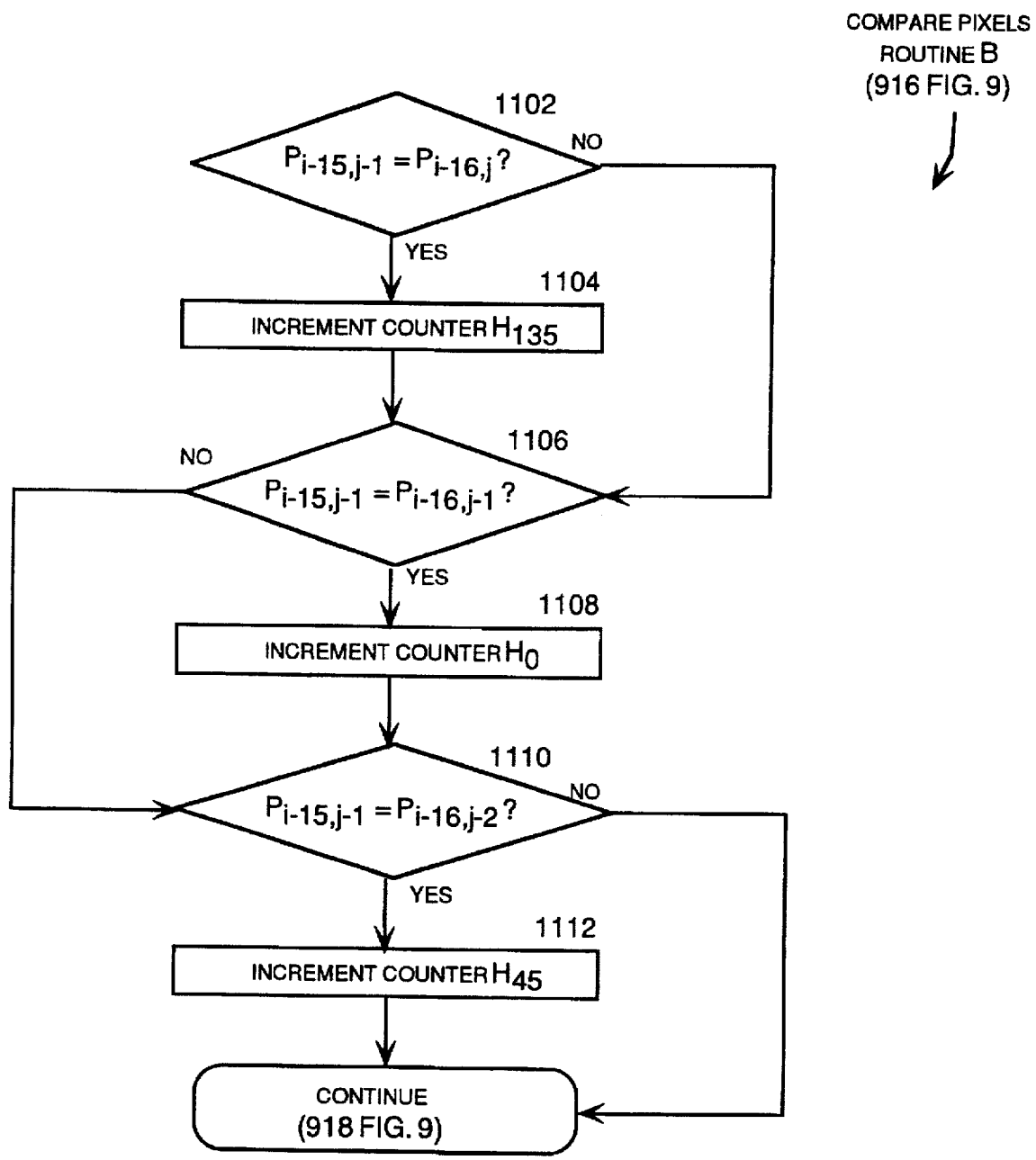
FIG. 11 is an alternative logical flow diagram of a computer-implemented routine for computing horizontal comparison values.

FIG. 11 illustrates the computer-implemented routine 916 of FIG. 9. Routine 916 is applied when the pixel counter pixel_NUM is less than 32. In step 1102, it is determined whether the pixel $P_{i-15,j-1}$ is equal to the pixel $P_{i-16,j}$. In other words, whether the pixel shift of the function block 98 caused by reading the pixel $P_{i,j}$ into the omnidirectional barcode locator 20 caused a 135° pixel match to enter the horizontal window 37. If the answer to the inquiry of step 1102 is yes, the "YES" branch is followed to step 1104 in which the counter for the horizontal comparison value $H_{135}$ is incremented. As the pixel counter pixel_NUM is less than 32, the counter for the horizontal comparison value $H_{135}$ can only be incremented in routine 916.

Step 1104 and the "NO" branch of step 1102 are followed by step 1106 in which it is determined whether the pixel $P_{i-15,j-1}$ is equal to the pixel $P_{i-16,j-1}$. In other words, whether the pixel shift of the function block 98 caused by reading the pixel $P_{i,j}$ into the omnidirectional barcode locator 20 caused a 0° pixel match to enter the horizontal window 37. If the answer to the inquiry of step 1106 is yes, the "YES" branch follow to step 1108 in which the counter for the horizontal comparison value $H_0$ is incremented. As the pixel counter pixel_NUM is less than 32, the counter for the horizontal comparison value $H_0$ can only be incremented in routine 916.

Step 1108 and the "NO" branch of step 1106 are followed by step 1110 in which it is determined whether the pixel $P_{i-15,j-1}$ is equal to the pixel $P_{i-16,j-2}$. In other words, whether the pixel shift of the function block 98 caused by reading the pixel $P_{i,j}$ into the omnidirectional barcode locator 20 caused a 45° pixel match to enter the horizontal window 37. If the answer to the inquiry of step 1110 is yes, the "YES" branch is followed to step 1112 in which the horizontal comparison value $H_{45}$ is incremented. As the pixel counter pixel_NUM is less than 32, the counter for the horizontal comparison value $H_{45}$ can only be incremented in routine 916. Step 1112 and the "NO" branch of step 1110 are followed by the continue step in which the computer-implemented process illustrated by FIG. 9 continues at step 918.

Figure 12:
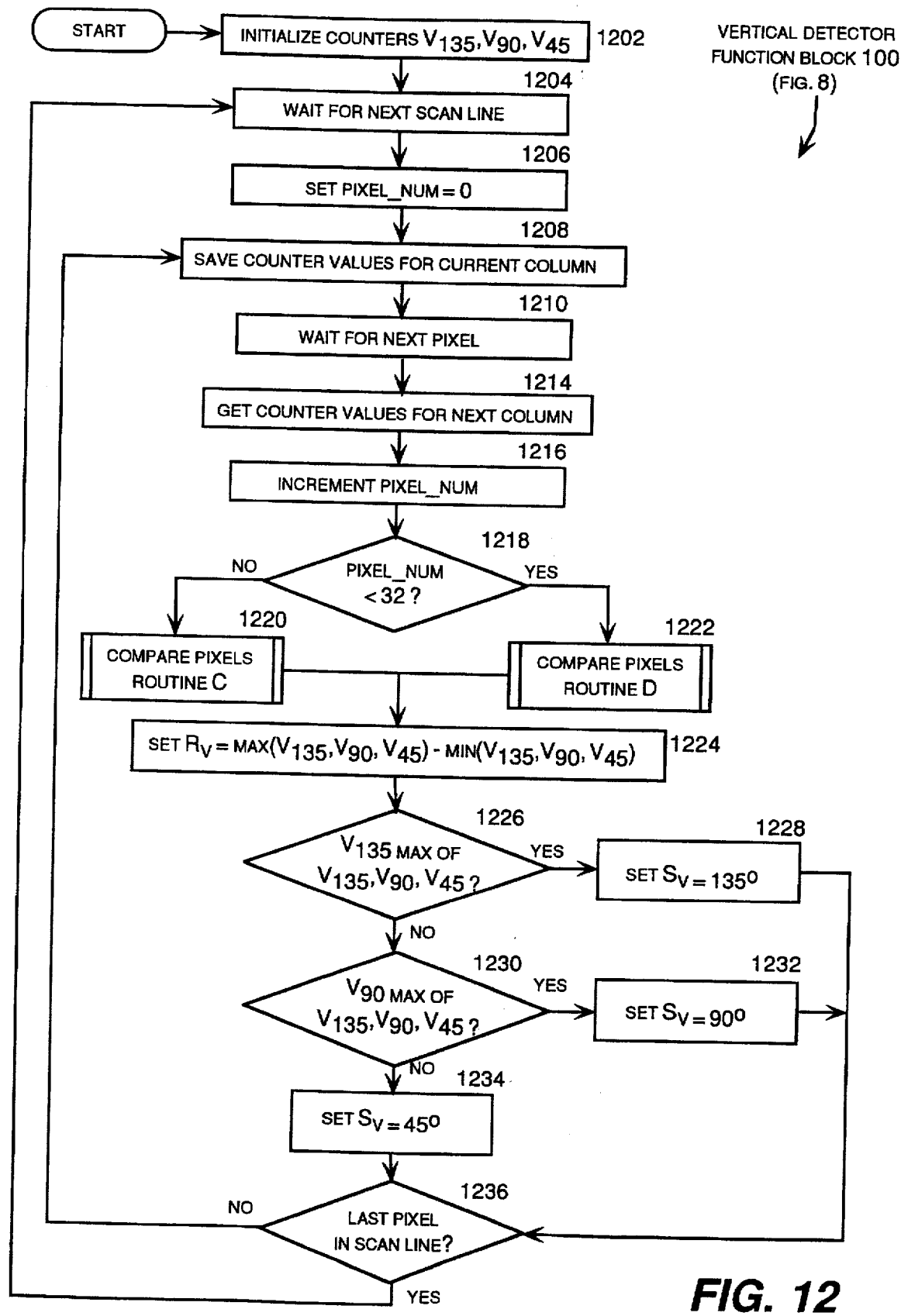
FIG. 12 is a logical flow diagram of a computer-implemented process for a vertical detector.

FIG. 12 illustrates the computer-implemented routine for function block 100 of the vertical detector 72. In step 1202, counters for the vertical comparison values $V_{135}$, $V_{90}$, and $V_{45}$ are set to zero. In step 1204, the function block 100 waits for the next scan line. In step 1206, the pixel counter pixel_NUM is set equal to zero. In step 1208, the counter values for the vertical comparison values $V_{135}$, $V_{90}$, and $V_{45}$ for the previous column 44 are saved in the RAM 73. In step 1210, the function block 100 waits for the next pixel. In step 1214, the function block 100 retrieves the counter values for the vertical comparison values $V_{135}$, $V_{90}$, and $V_{45}$ for the current column 42 from the RAM 73. In step 1216, the pixel counter pixel_NUM is incremented. In step 1218, it is determined whether the pixel counter pixel_NUM is less than 32. If the pixel counter pixel_NUM is less than 32, the "YES" branch followed to routine 1222. If the pixel counter pixel_NUM is not less than 32, the "NO" branch is followed to routine 1220. Routines 1220 and 1222 are described with more particularity with respect to FIGS. 13 and 14.

Routines 1220 and 1222 are both followed by step 1224 in which the vertical barcode detection value $R_V$ is set to the maximum of $V_{135}$, $V_{90}$, and $V_{45}$ minus the minimum of $V_{135}$, $V_{90}$, and $V_{45}$. Step 1224 is followed by step 1226 in which it is determined whether the vertical comparison value $V_{135}$ is the maximum of the three vertical comparison values $V_{135}$, $V_{90}$, and $V_{45}$. If the vertical comparison value $V_{135}$ is the maximum, the "YES" branch is followed to step 1228 in which the vertical barcode orientation value $S_V$ is set to 135°. If the vertical comparison value $V_{135}$ is not the maximum, the "NO" branch is followed from step 1226 to step 1230 in which it is determined whether the vertical comparison value $V_{90}$ is the maximum of the vertical comparison values $V_{135}$, $V_{90}$, and $V_{45}$. If the vertical comparison value $V_{90}$ is the maximum, the vertical barcode orientation value $S_V$ is set equal to 90° in step 1233. If the vertical comparison value $V_{90}$ is not the maximum, the "NO" branch is followed by step 1232 to 1234 in which the vertical barcode orientation value is set to 45°.

Steps 1228, 1232, and 1234 are followed by step 1236 in which it is determined whether the current pixel is the last pixel in the current scan line. If the current pixel is not the last pixel in the current scan line, the "NO" branch is followed back to step 1208 in which the counter values for the vertical comparison values of the current column are saved in the RAM 73. If the current pixel is the last pixel in the scan line, the "YES" branch is followed from step 1236 to step 1204 in which the function block 100 waits for the next scan line. It will be appreciated that the routine described above for the function block 100 results in a vertical barcode detection value $R_V$ and a vertical barcode orientation value $S_V$ for each pixel of the video image 30.

Figure 13:
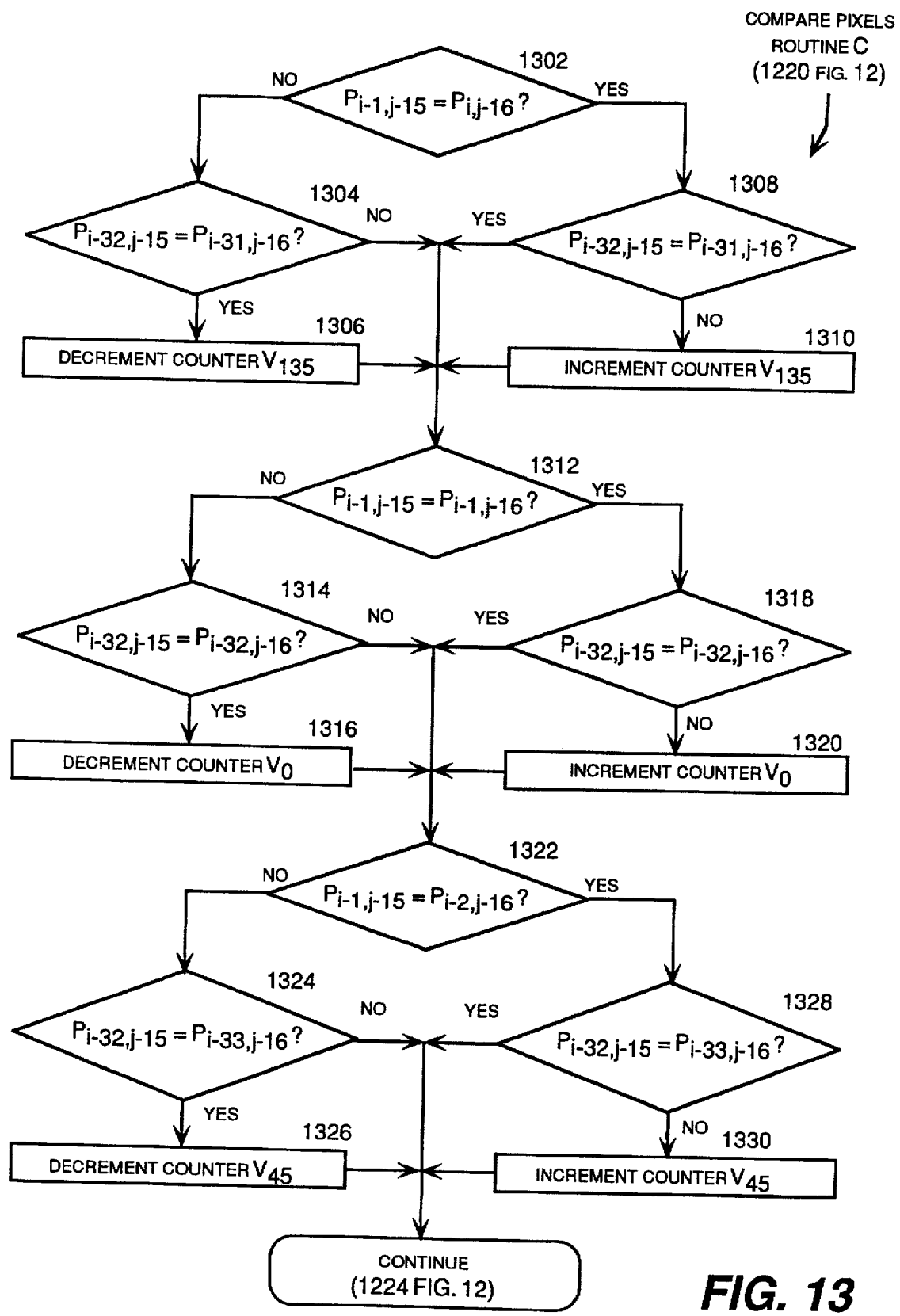
FIG. 13 is a logical flow diagram of a computer-implemented routine for computing vertical comparison values.

FIG. 13 is a logical flow diagram of the routine 1220 of FIG. 12. The routine illustrated by FIG. 13 is virtually identical to the routine of FIG. 10, except that the routine of FIG. 13 corresponds to the vertical window 36 whereas the routine of FIG. 10 corresponds to the horizontal window 37. More specifically, the steps 1302 through 1310 determine whether the counter for the vertical comparison value $V_{135}$ should be incremented or decremented using the "Net Gain/ Reduction Method" described previously with respect FIG. 10. Similarly, the steps 1312 through 1320 determine whether the counter for the vertical comparison value $V_0$ should be incremented or decremented using the "Net Gain/ Reduction Method," and the steps 1322 through 1330 determine whether the vertical comparison value $V_{45}$ should be incremented or decremented using the "Net Gain/Reduction Method." Routine 1220 shown on FIG. 13 ends with the continue step in which the computer implemented process shown on FIG. 12 continues at step 1224.

Figure 14:
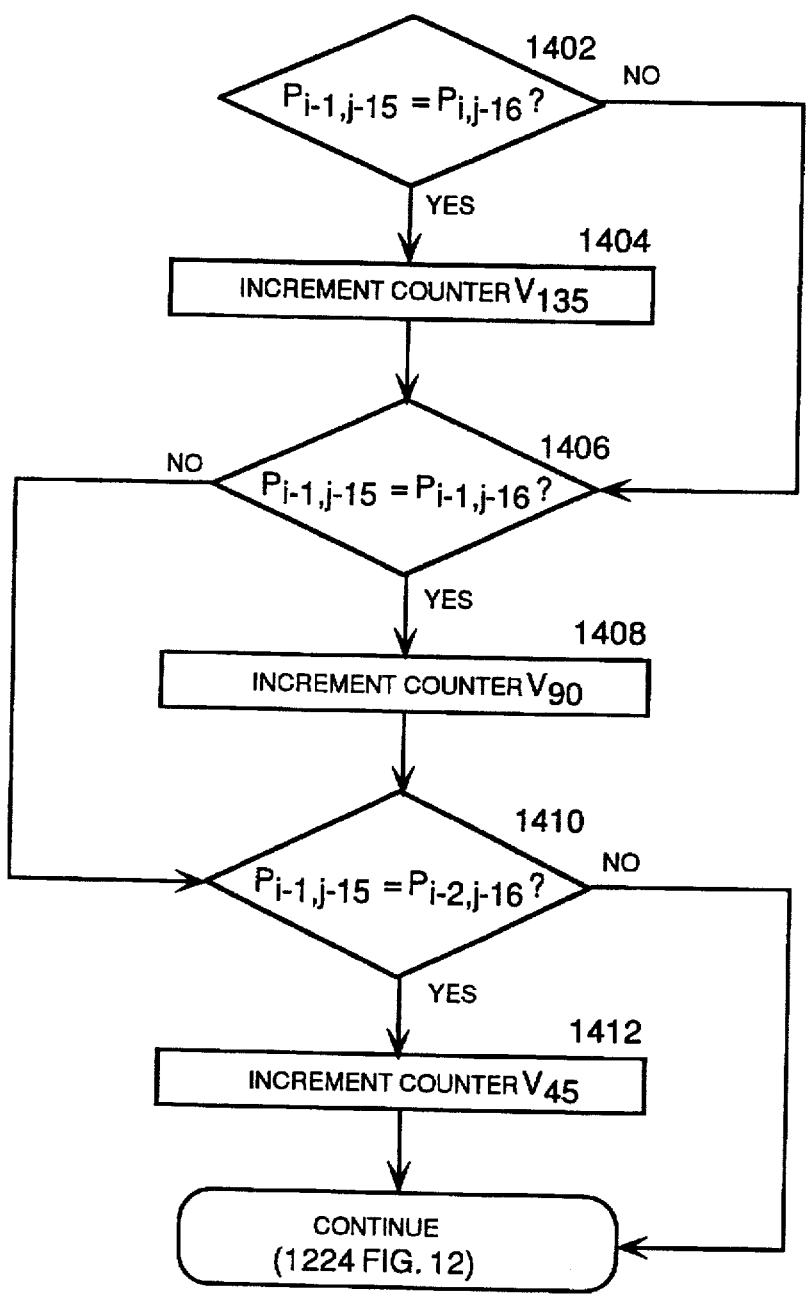
FIG. 14 is an alternative logical flow diagram of a computer-implemented routine for computing vertical comparison values.

FIG. 14 illustrates a logical flow diagram for the routine 1222 of FIG. 12. The process illustrated by FIG. 14 is virtually identical to the process illustrated by FIG. 11, except that the process of FIG. 11 corresponds to the horizontal window 37 whereas the process illustrated by FIG. 14 corresponds to the vertical window 36.

Figure 15:
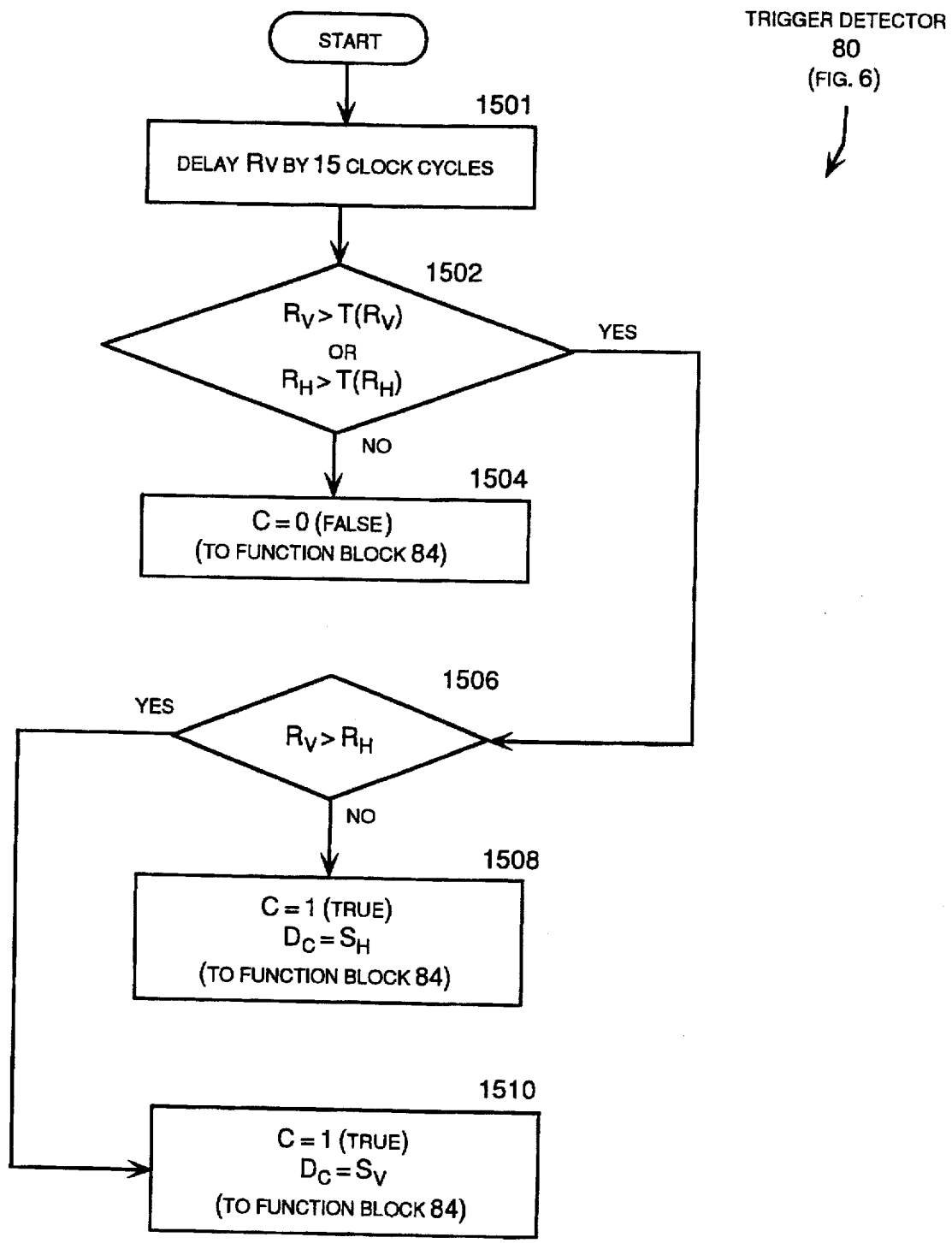
FIG. 15 is a logical flow diagram of a computer-implemented process for a trigger detector.

FIG. 15 illustrates a computer implemented process for the trigger detector 80. In step 1501, the computation of the vertical barcode detection value $R_V$ is delayed by 15 clock cycles. The 15 clock cycle delay effectively shifts the vertical window 36 15 pixels to the right so that it is positioned in the center of the horizontal window 37 as shown on FIG. 3B. In step 1502, it is determined whether the vertical barcode detection value $R_V$ is greater than the vertical barcode detection threshold value $T(R_V)$ or whether the horizontal barcode detection value $R_H$ is greater than the horizontal barcode detection threshold value $T(R_H)$. In other words, in step 1502 it is determined whether a sufficient number of matches were found in at least one of the comparison values $H_{135}$, $H_0$, $H_{45}$, $V_{135}$, $V_{90}$, $V_{45}$ to determine that a barcode has been detected at the location of the current pixel $P_{i-15,j-15}$. If the answer to the inquiry of step 1502 is no, the "NO" branch is followed to step 1504 in which the candidate value C is set to zero (i.e., false) indicating no barcode detection for the current pixel $P_{i-15,j-15}$.

If the result of the inquiry of step 1502 is yes, the "YES" branch is followed from step 1502 to step 1506 in which it is determined whether the vertical barcode detection value $R_V$ is greater than the horizontal barcode detection value $R_H$. If the answer to the inquiry of step 1506 is no, the "NO" branch is followed to step 1508 in which the candidate value C is set equal to one (i.e., true) and the candidate orientation value $D_C$ is set equal to the value of the horizontal barcode orientation value $S_H$. If the result of the inquiry of step 1506 is yes, the "YES" branch is followed to step 1510 in which the candidate value C is set equal to one and the candidate orientation value $D_C$ is set equal to the value of the vertical barcode orientation value $S_V$. Referring to FIG. 6, the candidate value C and the candidate orientation value $D_C$ are provided to the totalizer 84. It will be appreciated that the computer-implemented routine illustrated by FIG. 15 results in a candidate value C, either a zero or a one, and a candidate orientation value $D_C$ being computed for each pixel of the video image 30.

Figure 16:
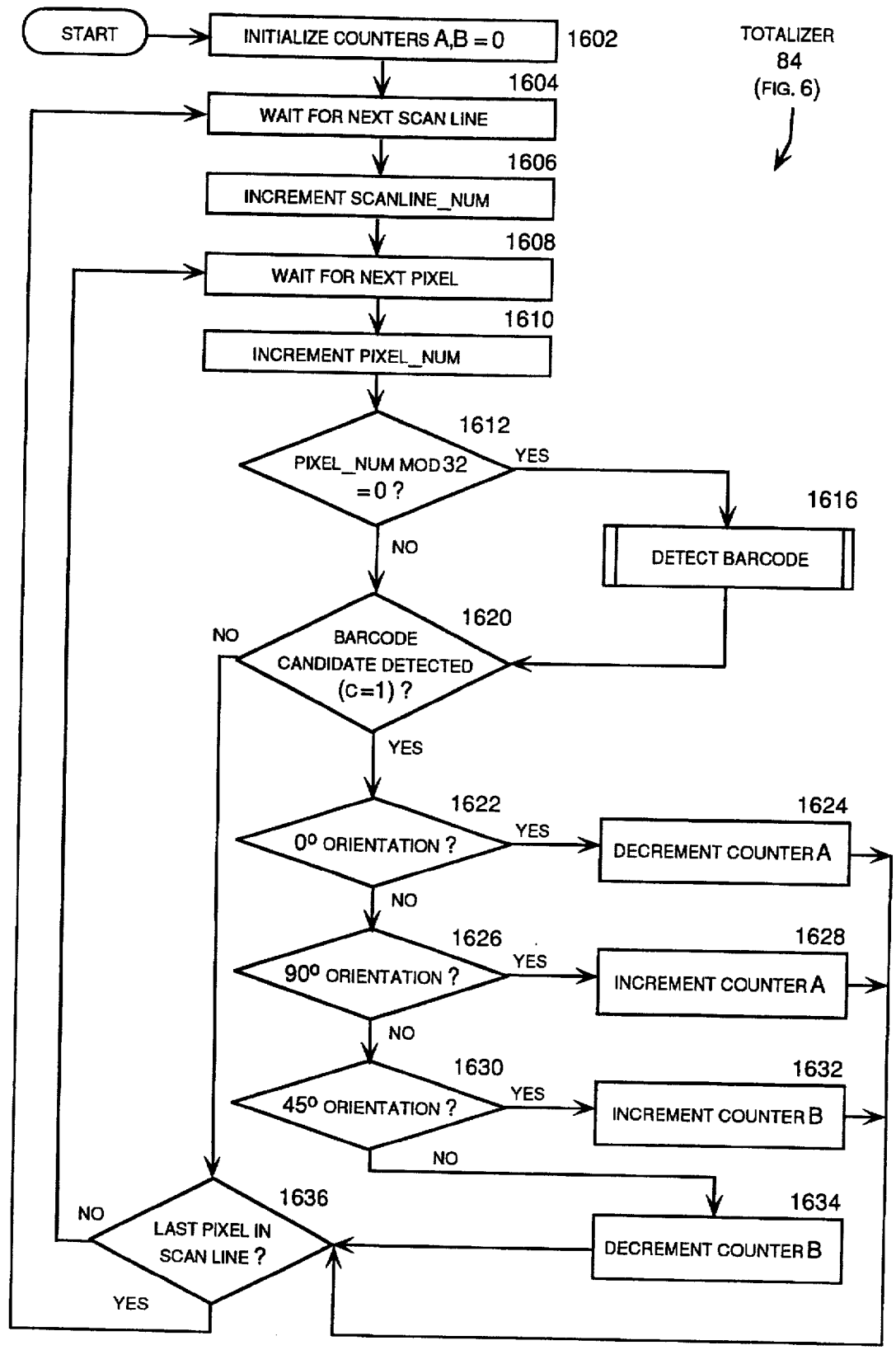
FIG. 16 is a logical flow diagram of a computer-implemented process for a totalizer.

FIG. 16 illustrates a computer implemented process for the totalizer 84. The totalizer determines whether a barcode is detected within each cell such as the representative cell 35, as shown in FIG. 2B. In step 1602, counters A and B are set equal to zero. In step 1604, the totalizer 84 waits for the next scan line. In step 1606, the scan line counter scanline_NUM is incremented by one. The scan line counter for the totalizer 84 scanline_NUM counts one through 36 and then rolls over, corresponding the number of partial scan lines in a cell such as the representative cell 35. In step 1608, the totalizer 84 waits for the next pixel. In step 1610, the pixel counter pixel_NUM is incremented. Step 1610 is followed by decision step 1612 in which it is determined whether the following condition is met:

Pixel_NUM MOD 32=0.

Those skilled in the art will appreciate that the logical expression pixel_NUM MOD 32=0 toggles from false to true every multiple of 32, i.e., at 32, 64, 96, 128, etc. This operation corresponds to dividing the 4,096 pixels of a scan line such as the representative scan line 34 into partial scan lines each having a width of 32 pixels as shown in FIG. 2B. If the answer to the inquiry of step 1612 is true, the "YES" branch is followed to routine 1616 in which a barcode may be detected within a cell. Routine 1616 is described with more particularly with respect to FIG. 17.

If the answer to the inquiry of step 1612 is false, the "NO" branch is followed from step 1612 to step 1620 in which it is determined whether a barcode candidate has been detected for the current pixel (i.e., whether the candidate value C=one). If a barcode candidate has been detected, the "YES" branch is followed to step 1612 in which it is determined whether the candidate orientation value $D_C$ for the current pixel is equal to 0°. If the answer to the inquiry to step 1622 is yes, the "YES" branch is followed to step 1624 in which the counter A is decremented. If the answer to the inquiry of step 1622 is no, the "NO" branch is followed to step 1626, in which it is determined whether the candidate orientation value is equal to 90°. If the answer to the inquiry of step 1626 is yes, the "YES" branch is followed to step 1628 in which the counter A is incremented. If the inquiry of step 1627 is no, the "NO" branch is followed to step 1630 in which it is determined whether the candidate orientation value is equal to 45°. If the inquiry of step 1630 is yes, the "YES" branch is followed to step 1632 in which counter B is incremented. If the answer to the inquiry of step 1630 is no, the "NO" branch is followed to step 1634 in which counter B is decremented. The step 1624, 1628, 1632, and 1634 are all followed by step 1636. It will be appreciated the computer-implemented process illustrated by FIG. 16 evinces efficiency in the design of the omnidirectional barcode locator 20 in that only two counters, counters A and B, are used to select among four possible orientations, 0°, 90°, 45°, and 135°, for a barcode detected within a cell.

In step 1636, it is determined whether the current pixel is the last pixel in the scan line. If the current pixel is not last pixel in the scan line, the "NO" branch is followed by from step 1636 to step 1608 in which the totalizer 84 waits for the next pixel. If the current pixel is the last pixel in the scan line, the "YES" branch is followed from step 1636 to step 1604 in which the totalizer 84 waits for the next scan line.

Figure 17:
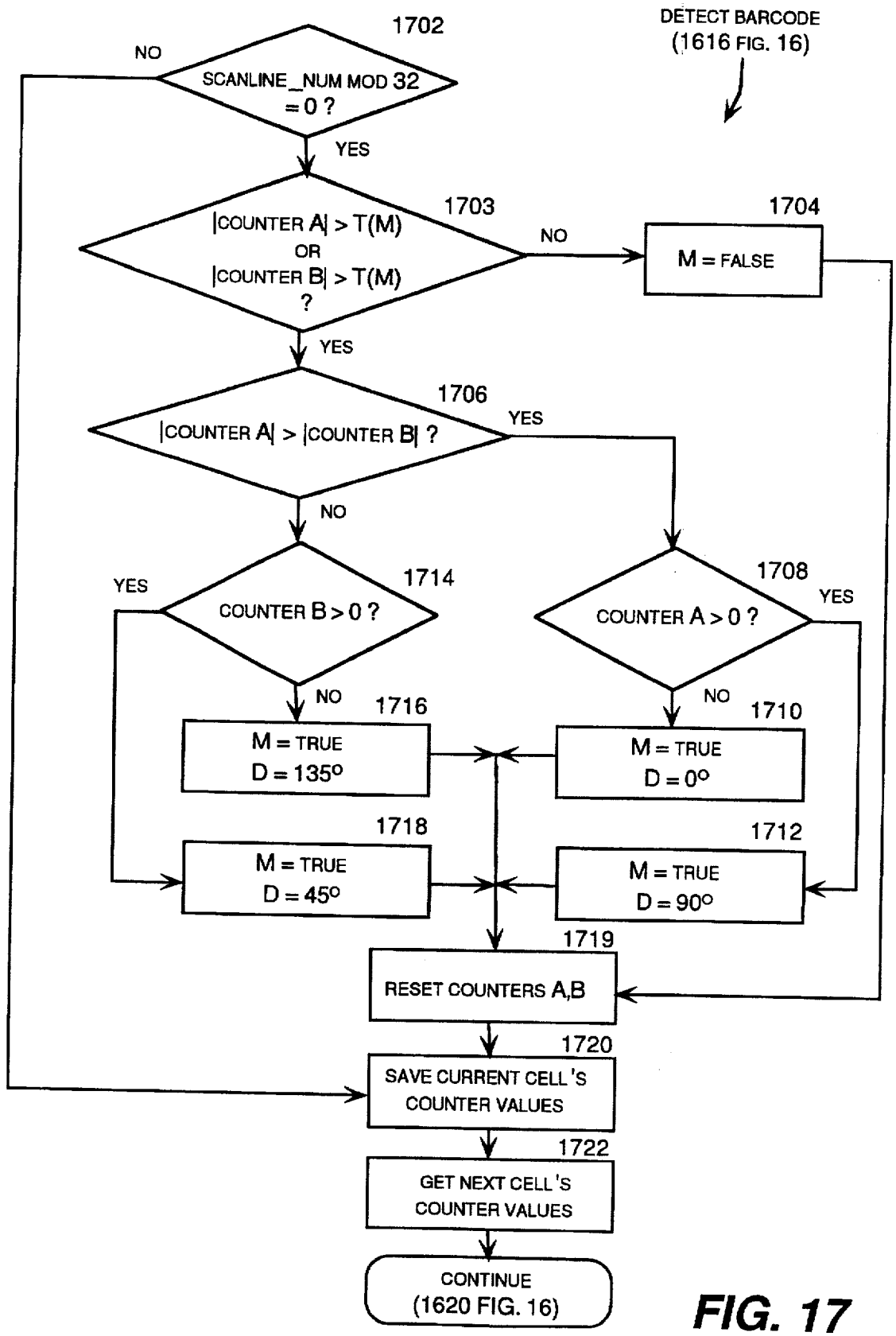
FIG. 17 is a logical flow diagram of a routine for determining the detection of a barcode.

FIG. 17 illustrates a logical flow diagram for the computer implemented routine 1616 of FIG. 16. In step 1702, it is determined whether the following condition is met:

Scanline_NUM MOD 32=0.

Those skilled in the art will understand that the logical operation scanline_NUM MOD 32=0 effectively toggles from false to true every time the value scanline_NUM equals a multiple of 32. This operation effectively divides the image 30 into cells 32 pixels high as shown on FIG. 2B. When the answer to the inquiry of step 1702 is yes, a complete cell such as the representative cell 35 has been processed by the omnidirectional barcode locator 20, and the "YES" branch is followed from step 1702 to step 1703. In step 1703, it is determined whether the absolute value of counter A or the absolute value of counter B is greater than the cell threshold value T(M). If the answer to the inquiry of step 1703 is no, the "NO" branch is followed to step 1704 in which the barcode indication value M is set to "FALSE" and the barcode detection signal 21 shown in FIGS. 1 and 6 reflects no detection of a barcode within the cell. Step 1704 is followed by step 1719 in which the counters A and B are reset to zero.

If the inquiry of step 1703 is true, a barcode has been detected within the current cell and the "YES" branch is followed to step 1706. In step 1706, it is determined whether the absolute value of counter A is greater than the absolute value of counter B. If the answer to the inquiry of step 1706 is yes, the "YES" branch is followed to step 1708 in which it is determined whether the value of the counter A is greater than zero. If the value of the counter A is greater than zero, the "YES" branch is followed to step 1712 in which the barcode indication value M is set to "TRUE" and the barcode orientation value D and is set to 90°. The barcode detection signal 21 correspondingly reflects a barcode detection within the cell and the barcode orientation signal 22 reflects an orientation of 90°. If the counter A is not greater than zero, the "NO" branch is followed by step 1708 to step 1710 in which the barcode detection signal M is set to true and the barcode orientation signal D is set to 0°. The barcode detection signal 21 correspondingly reflects a barcode detection within the cell and the barcode orientation signal 22 reflects an orientation of 0°.

If the answer to the inquiry of step 1706 is no, the "NO" branch is followed to step 1714 in which it is determined whether the value of the counter B is greater than zero. If the value of the counter B is greater than zero, the "YES" branch is followed from step 1714 to step 1718 in which the barcode indication value M is set to "TRUE" and the barcode orientation value D is set to 45°. The barcode detection signal 21 correspondingly reflects a barcode detection within the cell and the barcode orientation signal 22 reflects an orientation of 45°. If the value of the counter B is not greater than zero, the "NO" branch is followed from step 1714 to step 1716 in which the barcode indication value M is set to "TRUE" and the barcode orientation value D is set to 135°. The barcode detection signal 21 correspondingly reflects a barcode detection within the cell and the barcode orientation signal 22 reflects an orientation of 135°.

Steps 1704, 1710, 1712, 1716, and 1718 are all followed by step 1719 in which the counters A and B are reset to zero. Step 1719 and the "NO" branch from step 1702 are followed by step 1720 in which the current cell's counter values are stored in RAM 87. In step 1722, the totalizer 84 gets the next cell's counter values from the RAM 87. Step 1722 is followed by the continue step in which the computer implemented process for the totalizer continues with step 1620 shown on FIG. 16. It will be appreciated that the computer-implemented process illustrated by FIGS. 16 and 17 results in a cell barcode indication value M and a cell barcode orientation value D for each cell of the video image 30.

In the manner described above, the omnidirectional barcode locator 20 produces, in real-time, a barcode detection signal 21 and a barcode orientation signal 22 for each cell of the video image 30. It will be appreciated that the present invention provides an improved method and apparatus for a high speed, low cost omnidirectional barcode locator. The present invention also provides a computationally efficient omnidirectional barcode locator. More specifically, the present invention provides an omnidirectional barcode locator that can be used to determine in real-time the location and approximate orientation of a barcode on a parcel moving along a conveyor so that the amount of camera data that must be stored for subsequent processing by a barcode reader may be reduced. It should be understood that the foregoing relates only to specific embodiments of the present invention, and that numerous changes may be made therein without departing from the spirit and scope of the invention as defined by the following claims.

What is claimed is:

1. A method for detecting and storing an image of a barcode on a substrate, comprising the steps of:

obtaining a pixel stream defining a pixelized image of the substrate;

channeling said pixel stream through a buffer memory;

assigning pixels from said pixel stream to a plurality of cells; and for each of a plurality of said cells determining a cell barcode indication value whereby the cell barcode indication value reflects the likelihood of a barcode being present within the cell, and storing pixels within said cell in a computer memory if said cell barcode indication value is greater than a predetermined threshold value.

2. The method of claim 1, further comprising the steps of:

for each of a plurality of said cells determining a cell barcode orientation value, and storing a representation of said cell barcode orientation value in a mass storage computer memory if said cell barcode indication value is greater than said predetermined threshold value.

3. A method for detecting the presence of a barcode on a substrate, comprising the steps of:

obtaining a pixelized image of the substrate, said pixelized image comprising sequential parallel left-to-right rows of pixels forming orthogonal bottom-to-top columns of pixels;

computing a first horizontal comparison value by comparing intensity of pixels of a current row to intensity of pixels of a previous row wherein, for each comparison, the column of the pixel of said current row is to the left of the column of the pixel of said previous row;

computing a second horizontal comparison value by comparing intensity of pixels of said current row to intensity of pixels of said previous row wherein, for each comparison, the column of the pixel of said current row is the same as the column of the pixel of said previous row;

computing a third horizontal comparison value by comparing intensity of pixels of said current row to intensity of pixels of said previous row wherein, for each comparison, the column of the pixel of said current row is to the right of the column of the pixel of said previous row;

computing a horizontal barcode detection value based on one or more of said first, second, and third comparison values; and comparing said horizontal barcode detection value to a horizontal barcode detection threshold value.

4. The method of claim 3, wherein:

said previous row immediately precedes said current row;

said step of computing a first horizontal comparison value comprises comparing intensity of pixels of said current row to intensity of pixels of said previous row wherein, for each comparison, the column of the pixel of said current row is one column to the left of the column of the pixel of said previous row; and said step of computing a third horizontal comparison value comprises comparing intensity of pixels of said current row to intensity of pixels of said previous row wherein, for each comparison, the column of the pixel of said current row is one column to the right of the column of the pixel of said previous row.

5. The method of claim 3, further comprising the step of, if said horizontal barcode detection value is greater than said horizontal barcode detection threshold value, storing said pixelized image in a mass storage computer memory.

6. The method of claim 3, wherein said steps of computing said first, second, and third horizontal comparison values comprises the steps of:

for each of a plurality of pixels of said image defining a horizontal window comprising a plurality of adjacent pixels along a current row of pixels, computing a first horizontal comparison value by comparing intensity of pixels of said current row within said horizontal window to intensity of pixels of a previous row wherein, for each comparison, the column of the pixel of said current row is to the left of the column of the pixel of said previous row, computing a second horizontal comparison value by comparing intensity of pixels of said current row within said horizontal window to intensity of pixels of said previous row wherein, for each comparison, the column of the pixel of said current row is the same as the column of the pixel of said previous row, computing a third comparison value by comparing intensity of pixels of said current row within said horizontal window to intensity of pixels of said previous row wherein, for each comparison, the column of the pixel of said current row is to the right of the column of the pixel of said previous row, computing a horizontal barcode detection value based on one or more of said first, second, and third horizontal comparison values, and comparing said horizontal barcode detection value to a horizontal barcode detection threshold value.

7. The method of claim 3, further comprising the step of computing a horizontal barcode orientation value based on one or more of said first, second, and third horizontal comparison values.

8. The method of claim 7, further comprising the steps of, if said horizontal barcode detection value is greater than said horizontal barcode detection threshold value:

storing a portion of said pixelized image in a mass storage computer memory; and storing a representation of said horizontal barcode orientation value in said mass storage computer memory.

9. A method for detecting the presence of a barcode on a substrate, comprising the steps of:

obtaining a pixelized image of the substrate, said pixelized image comprising sequential parallel left-to-right rows of pixels forming orthogonal bottom-to-top columns of pixels;

defining a cell comprising a plurality of pixels;

for each of a plurality of pixels within said cell defining a horizontal window comprising a plurality of adjacent pixels along a current row of pixels, computing a first horizontal comparison value by comparing intensity of pixels of said current row to intensity of pixels of a previous row wherein, for each comparison, the column of the pixel of said current row is to the left of the column of the pixel of said previous row, computing a second horizontal comparison value by comparing intensity of pixels of said current row to intensity of pixels of said previous row wherein, for each comparison, the column of the pixel of said current row is the same as the column of the pixel of said previous row, computing a third horizontal comparison value by comparing intensity of pixels of said current row to intensity of pixels of said previous row wherein, for each comparison, the column of the pixel of said current row is to the right of the column of the pixel of said previous row, computing a horizontal barcode detection value based on one or more of said first, second, and third horizontal comparison values, and comparing said horizontal barcode detection value to a horizontal barcode detection threshold value;

computing a cell barcode indication value based on said horizontal barcode detection values; and comparing said cell barcode indication value to a cell threshold value.

10. The method of claim 9, further comprising the steps of:

for each of a plurality of pixels within said cell, computing a horizontal barcode orientation value based on one or more of said first, second, and third horizontal comparison values; and computing a cell barcode orientation value based on said horizontal barcode orientation values.

11. The method of claim 10, further comprising the steps of, if said cell barcode indication value is greater than said cell threshold value:

storing the portion of said pixelized image that is within said cell in a mass storage computer memory; and storing a representation of said cell barcode orientation value in said mass storage computer memory.

12. The method of claim 9, further comprising the steps of:

for each of a plurality of pixels within said cell defining a vertical window comprising a plurality of adjacent pixels along a current column of pixels;

computing a first vertical comparison value by comparing intensity of pixels of said current column to intensity of pixels of a previous column wherein, for each comparison, the row of the pixel of said current row is to the top of the row of the pixel of said previous column, computing a second vertical comparison value by comparing intensity of pixels of said current column to intensity of pixels of said previous column wherein, for each comparison, the row of the pixel of said current column is the same as the row of the pixel of said previous column, computing a third vertical comparison value by comparing intensity of pixels of said current column to intensity of pixels of said previous column wherein, for each comparison, the row of the pixel of said current column is to the bottom of the row of the pixel of said previous column, computing a vertical barcode detection value based on one or more of said first, second, and third vertical comparison values, and comparing said vertical barcode detection value to a vertical barcode detection threshold value.

13. The method of claim 12, wherein:

said previous row immediately precedes said current row;

said previous column immediately precedes said current column;

said step of computing a first horizontal comparison value comprises comparing intensity of pixels of said current row to intensity of pixels of said previous row wherein, for each comparison, the column of the pixel of said current row is one column to the left of the column of the pixel of said previous row;

said step of computing a third horizontal comparison value comprises comparing intensity of pixels of said current row to intensity of pixels of said previous row wherein, for each comparison, the column of the pixel of said current row is one column to the right of the column of the pixel of said previous row;

said step of computing a first vertical comparison value comprises comparing intensity of pixels of said current column to intensity of pixels of said previous column wherein, for each comparison, the row of the pixel of said current column is one row to the top of the row of the pixel of said previous column; and said step of computing a third vertical comparison value comprises comparing intensity of pixels of said current column to intensity of pixels of said previous column wherein, for each comparison, the row of the pixels of said current column is one row to the bottom of the row of the pixel of the previous column.

14. The method of claim 12, further comprising the steps of, if said cell barcode indication value is greater than said cell threshold value:
   storing the portion of said pixelized image that is within said cell in a mass storage computer memory; and
   storing a representation of said cell barcode orientation value in said mass storage computer memory.

15. The method of claim 12, wherein said steps performed for each row of pixels within said cell are performed concurrently with said steps performed for each column of pixels within said cell.

16. The method of claim 12, further comprising the steps of:
   for each of a plurality of pixels within said cell
      computing a horizontal barcode orientation value based on one or more of said first, second, and third horizontal comparison values;
      computing a vertical barcode orientation value based on one or more of said first, second, and third vertical comparison values; and
      computing a cell barcode orientation value based on said horizontal and vertical barcode orientation values.

17. The method of claim 16, wherein:
   said steps performed for each row of pixels within said cell are performed concurrently with said steps performed for each column of pixels within said cell;
   said step of computing said horizontal barcode orientation value is performed concurrently with said step of computing said horizontal barcode detection value; and
   said step of computing said vertical barcode orientation value is performed concurrently with said step of computing said vertical barcode detection value.

18. A method for detecting the presence of a barcode on a substrate, comprising the steps of:
   obtaining a pixelized image of the substrate, said pixelized image comprising sequential parallel left-to-right rows of pixels forming orthogonal bottom-to-top columns of pixels;
   defining a plurality of cells, each cell comprising a plurality of pixels; and
   for each of a plurality of cells
      for each of a plurality of pixels within said cell
         defining a horizontal window comprising a plurality of adjacent pixels along a current row of pixels;
         defining a vertical window comprising a plurality of adjacent pixels along a current column of pixels;
         computing a first horizontal comparison value by comparing intensity of pixels of said current row to intensity of pixels of a previous row wherein, for each comparison, the column of the pixel of said current row is to the left of the column of the pixel of said previous row,
         computing a second horizontal comparison value by comparing intensity of pixels of said current row to intensity of pixels of said previous row wherein, for each comparison, the column of the pixel of said current row is the same as the column of the pixel of said previous row,
         computing a third horizontal comparison value by comparing intensity of pixels of said current row to intensity of pixels of said previous row wherein, for each comparison, the column of the pixel of said current row is to the right of the column of the pixel of said previous row,
         computing a horizontal barcode detection value based on one or more of said first, second, and third horizontal comparison values,
         computing a first vertical comparison value by comparing intensity of pixels of said current column to intensity of pixels of a previous column wherein, for each comparison, the row of the pixel of said current row is to the top of the row of the pixel of said previous column,
         computing a second vertical comparison value by comparing intensity of pixels of said current column to intensity of pixels of said previous column wherein, for each comparison, the row of the pixel of said current column is the same as the row of the pixel of said previous column,
         computing a third vertical comparison value by comparing intensity of pixels of said current column to intensity of pixels of said previous column wherein, for each comparison, the row of the pixel of said current column is to the bottom of the row of the pixel of said previous column,
         computing a vertical barcode detection value based on one or more of said first, second, and third vertical comparison values,
         comparing said horizontal barcode detection value to a horizontal barcode detection threshold value, and
         comparing said vertical barcode detection value to a vertical barcode detection threshold value;
      computing a cell barcode indication value based on said horizontal and vertical barcode detection values,
      comparing said cell barcode indication value to a cell threshold value, and
      if said cell barcode indication value is greater than said cell threshold value, storing the portion of said pixelized image that is within said cell in a mass storage computer memory.

19. The method of claim 18, further comprising the steps of, for each of said plurality of said cells:
   for each of a plurality of pixels within said cell
      computing a horizontal barcode orientation value based on one or more of said first, second, and third horizontal comparison values,
      computing a vertical barcode orientation value based on one or more of said first, second, and third vertical comparison values,
      computing a cell barcode orientation value based on said horizontal and vertical barcode orientation values; and
   if said cell barcode indication value is greater than said cell threshold value, storing a representation of said cell barcode orientation value in said mass storage computer memory.

20. An apparatus operable for detecting the presence and approximate orientation of a barcode on a substrate, comprising:
   a buffer memory operable for receiving a digital video signal comprising a pixelized image of the substrate, said pixelized image comprising sequential parallel left-to-right rows of pixels forming orthogonal bottom-to-top columns of pixels;
   a horizontal detector operable for
      receiving a stream of pixels from said buffer memory, and for a plurality of said pixels
defining a horizontal window comprising a plurality of adjacent pixels along a current row of pixels, and
computing a horizontal barcode detection value based on a comparison of the pixels of said current row to the pixels of a previous row;

a vertical detector operable for
receiving a stream of pixels from said buffer memory, and
for a plurality of said pixels
defining a vertical window comprising a plurality of adjacent pixels along a current column of pixels, and
computing a vertical barcode detection value based on a comparison the pixels of said current column to the pixels of a previous column;

a trigger detector operable for
receiving said horizontal barcode detection values from said horizontal detector and for receiving said vertical barcode detection values from said vertical detector, and
determining a candidate value for a plurality of said pixels, each said candidate value being based on a horizontal barcode detection value and a vertical barcode detection value; and a totalizer operable for
receiving said candidate values from said trigger detector,
defining a cell comprising a plurality of said pixels, and
determining a cell barcode indication value based on the candidate values corresponding to the pixels within said cell.

21. The apparatus of claim 20, wherein:
said horizontal detector is further operable, for a plurality of said pixels, for computing a horizontal barcode orientation value based on a comparison of the pixels of said current row to the pixels of a previous row;

said vertical detector is further operable, for a plurality of said pixels, for computing a vertical barcode orientation value based on a comparison of the pixels of said current column to the pixels of a previous column;

said trigger detector is further operable, for a plurality of said pixels, for determining a candidate orientation value based on said horizontal and vertical barcode orientation values; and said totalizer is further operable for determining a cell barcode orientation value based on the candidate orientation values corresponding to the pixels within said cell.

22. The apparatus of claim 21, wherein one or more of said horizontal detector, said vertical detector, said trigger detector, and said totalizer comprise a field programmable gate array.

23. A storage medium for a computer program, said storage medium comprising a computer program providing a method for detecting the presence of a barcode on a substrate, said computer program comprising the steps of:
obtaining a pixelized image of the substrate, said pixelized image comprising sequential parallel left-to-right rows of pixels forming orthogonal bottom-to-top columns of pixels;

computing a first horizontal comparison value by comparing intensity of pixels of a current row to intensity of pixels of a previous row wherein, for each comparison, the column of the pixel of said current row is to the left of the column of the pixel of said previous row;

computing a second horizontal comparison value by comparing intensity of pixels of said current row to intensity of pixels of said previous row wherein, for each comparison, the column of the pixel of said current row is the same as the column of the pixel of said previous row;

computing a third horizontal comparison value by comparing intensity of pixels of said current row to intensity of pixels of said previous row wherein, for each comparison, the column of the pixel of said current row is to the right of the column of the pixel of said previous row;

computing a horizontal barcode detection value based on one or more of said first, second, and third comparison values; and comparing said horizontal barcode detection value to a horizontal barcode detection threshold value.

* * * * *